United States Patent Office 3,127,251
Patented Mar. 31, 1964

3,127,251
FUEL COMPOSITION CONTAINING METHYLOL PHENOL DERIVATIVES
Melvin De Groote, St. Louis, and Kwan-ting Shen, Brentwood, Mo., assignors to Petrolite Corporation, a corporation of Delaware
No Drawing. Original application May 12, 1960, Ser. No. 28,514. Divided and this application Apr. 10, 1961, Ser. No. 101,631
20 Claims. (Cl. 44—66)

This application is a division of our copending application Serial No. 28,514, filed May 12, 1960, which latter application is a continuation-in-part of our copending application Serial No. 730,510, filed April 24, 1958. See also our copending application Serial No. 797,830, filed March 9, 1959, which is a division of Serial No. 730,510. This invention relates to fuel composition containing (1) oxyalkylated, (2) acylated, (3) oxyalkylated then acylated, (4) acylated then oxyalkylated, and (5) acylated, then oxyalkylated and then acylated, monomeric polyaminomethyl phenols. These substituted phenols are produced by a process which is characterized by reacting a preformed methylol phenol (i.e. formed prior to the addition of the polyamine) with at least one mole of a secondary polyamine per equivalent of methylol group on the phenol, in the absence of an extraneous catalyst (in the case of an aqueous reaction mixture, the pH of the reaction mixture being determined solely by the methylol phenol and the secondary polyamine), until about one mole of water per equivalent of methylol group is removed; and then reacting this product with (1) an oxyalkylating agent, (2) an acylating agent, (3) an oxyalkylating agent then an acylating agent, (4) an acylating agent then an oxyalkylating agent or (5) in acylating agent then an oxyalkylating agent and then an acylating agent.

The reasons for the unexpected monomeric form and properties of the polyaminomethyl phenol are not understood, However, we have discovered that when
(1) A preformed methylolphenol (i.e. formed prior to the addition of the polyamine) employed as a starting material is reacted with
(2) A polyamine which contains at least one secondary amino group
(3) In amounts of at least one mole of secondary polyamine per equivalent of methylol group on the phenol,
(4) In the absence of an extraneous catalyst, until
(5) About one mole of water per equivalent of methylol group is removed, then a monomeric polyaminomethyl phenol is produced which is capable of being oxyalkylated, acylated, oxyalkylated then acylated, or acylated then oxyalkylated, or acylated, then oxyalkylated and then acylated to provide the superior products employed in the compositions and processes of this invention. All of the above five conditions are critical for the production of these monomeric polyaminomethyl phenols.

In contrast, if the methylol phenol is not preformed but is formed in the presence of the polyamine, or the preformed methylol phenol is condensed with the polyamine in the presence of an extraneous catalyst, either acidic or basic, for example, basic or alkaline materials such as NaOH, Ca(OH)$_2$, Na$_2$CO$_3$, sodium methylate, etc., a polymeric product is formed. Thus, if an alkali metal phenate is employed in place of the free phenol, or even if a lesser quantity of alkali metal is present than is required to form the phenate, a polymeric product is formed. Where a polyamine containing only primary amino groups and no secondary amino groups is reacted with a methylol phenol, a polymeric product is also produced. Similarly, where less than one mole of secondary amine is reacted per equivalent of methylol group, a polymeric product is also formed.

In general, the monomeric polyaminomethyl phenols are prepared by condensing the methylol phenol with the secondary amine as disclosed above, said condensation being conducted at a temperature sufficiently high to eliminate water but below the pyrolytic point of the reactants and product, for example, at 80° to 200° C., but preferably at 100° to 150° C. During the course of the condensation water can be removed by any suitable means, for example, by use of an azeotroping agent, reduced pressure, combinations thereof, etc. Measuring the water given off during the reaction is a convenient method of judging completion of the reaction.

The classes of methylol phenols employed in the condensation are as follows:

*Monophenols.*—A phenol containing 1, 2 or 3 methylol groups in the ortho or para position (i.e. the 2, 4, 6 positions), the remaining positions on the ring containing hydrogen or groups which do not interfere with the polyamine-methylol group condensation, for example, alkyl, alkenyl, cycloalkyl, phenyl, halogen, and alkoxy, etc., groups, and having but one nuclear linked hydroxyl group.

*Diphenols.*—One type is a diphenol containing two hydroxybenzene radicals directly joined together through the ortho or para (i.e. 2, 4, or 6) position with a bond joining the carbon of one ring with the carbon of the other ring, each hydroxybenzene radical containing 1 to 2 methylol groups in the 2, 4 or 6 positions, the remaining positions on each ring containing hydrogen or groups which do not interfere with the polyamine-methylol group condensation, for example, alkyl, alkenyl, cycloalkyl, phenyl, halogen, alkoxy, etc., groups, and having but two nuclear linked hydroxyl groups.

A second type is a diphenol containing two hydroxybenzene radicals joined together through the ortho or para (i.e. 2, 4, or 6 position) with a bridge joining the carbon of one ring to a carbon of the other ring, said bridge being, for example, alkylene, alkylidene, oxygen, carbonyl, sulfur, sulfoxide and sulfone, etc., each hydroxybenzene radical containing 1 to 2 methylol groups in the 2, 4, or 6 positions, the remaining positions on each ring containing hydrogen or groups which do not interfere with the polyamino-methylol group condensation, for example, alkyl, alkenyl, cycloalkyl, phenyl, halogen, alkoxy, etc., groups, and having but two nuclear linked hydroxyl groups.

The secondary polyamines employed in producing the condensate are illustrated by the following general formula:

where at least one of the R's contains an amino group and the R's contain alkyl, alkoxy, cycloalkyl, aryl, aralkyl, alkaryl radicals, and the corresponding radicals containing heterocyclic radicals, hydroxy radicals, etc. The R's may also be joined together to form heterocyclic polyamines. The preferred classes of polyamines are the alkylene polyamines, the hydroxylated alkylene polyamines, branched polyamines containing at least three primary amino groups, and polyamines containing cyclic amidine groups. The only limitation is that there shall be present in the polyamine at least one secondary amino group which is not bonded directly to a negative radical which reduces the basicity of the amine, such as a phenyl group.

An unusual feature of the products employed in the compositions and processes of the present invention is the discovery that methylol phenols react more readily under the herein specified conditions with secondary amino groups than with primary amino groups. Thus, where both primary and secondary amino groups are present in the same molecule, reaction occurs more readily with the secondary amino group. However, where the polyamine contains only primary amino groups, the product formed under reaction conditions as mentioned above is an insoluble resin. In contrast, where the same number of primary amino groups are present on the amine in addition to at least one secondary amino group, reaction occurs predominantly with the secondary amino group to form non-resinous derivatives. Thus, where trimethylol phenol is reacted with ethylene diamine, an insoluble resinous composition is produced. However, where diethylene triamine, a compound having just as many primary amino groups as ethylene diamine, is reacted, according to this invention a non-resinous product is unexpectedly formed.

The term "monomeric" as employed in the specification and claims refers to a polyaminomethylphenol containing within the molecular unit one aromatic unit corresponding to the aromatic unit derived from the starting methylol phenol and one polyamine unit for each methylol group originally in the phenol. This is in contrast to a polymeric or resinous polyaminomethyl phenol containing within the molecular unit more than one aromatic unit and/or more than one polyamino unit for each methylol group.

The monomeric products produced by the condensation of the methylol phenol and the secondary amine may be illustrated by the following "idealized" formula:

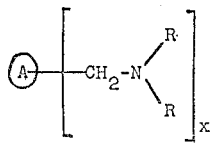

where A is the aromatic unit corresponding to that of the methylol reactant, and the remainder of the molecule is the polyaminomethyl radical, one for each of the original methylol groups.

This condensation reaction may be followed by oxyalkylation in the conventional manner, for example, by means of an alpha-beta alkylene oxide such as ethylene oxide, propylene oxide, butylene oxide, octylene oxide, a higher alkylene oxide, styrene oxide, glycide, methylglycide, etc., or combinations thereof. Depending on the particular application desired, one may combine a large proportion of alkylene oxide, particularly ethylene oxide, propylene oxide, a combination or alternate additions or propylene oxide and ethylene oxide, or smaller proportions thereof in relation to the methylol phenol-amine condensation product. Thus, the molar ratio of alkylene oxide to amine condensate can range within wide limits, for example, from a 1:1 mole ratio to a ratio of 1000:1, or higher, but preferably 1 to 200. For certain applications such as fuel oil additives, lower ratios of alkylene oxides are advantageously employed, i.e. 1–50 moles of alkylene oxide per mole of amine condensate. By proper control, desired hydrophilic or hydrophobic properties are imparted to the composition. As is well known, oxyalkylation reactions are conducted under a wide variety of conditions, at low or high pressures, at low or high temperatures, in the presence or absence of catalyst, solvent, etc. For instance oxyalkylation reactions can be carried out at temperatures of from 80–200° C., and pressures of from 10 to 200 p.s.i., and times of from 15 min. to several days. Preferably oxyalkylation reactions are carried out at 80 to 120° C. and 10 to 30 p.s.i. For conditions of oxyalkylation reactions see U.S. Patent 2,792,369 and other patents mentioned therein.

As in the amine condensation, acylation is conducted at a temperature sufficiently high to eliminate water and below the pyrolytic point of the reactants and the reaction products. In general, the reaction is carried out at a temperature of from 140° to 280° C., but preferably at 140° to 200° C. In acylating, one should control the reaction so that the phenolic hydroxyls are not acylated.

Because acyl halides and anhydrides are capable of reacting with phenolic hydroxyls, this type of acylation should be avoided. It should be realized that either oxyalkylation or acylation can be employed alone or each alternately, either one preceding the other. In addition, the amine condensate can be acylated, then oxyalkylated and then reacylated. The amount of acylation agent reacted will depend on reactive groups or the compounds and properties desired in the final product, for example, the molar ratios of acylation agent to amine condensate can range from 1 to 15, or higher, but preferably 1 to 4.

Where the above amine condensates are treated with alkylene oxides, the product formed will depend on many factors, for example, whether the amine employed is hydroxylated, etc. Where the amines employed are non-hydroxylated, the amine condensate is at least susceptible to oxyalkylation through the phenolic hydroxyl radical. Although the polyamine is non-hydroxylated, it may have one or more primary or secondary amino groups which may be oxyalkylated, for example, in the case of tetraethylene pentamine. Such groups may or may not be susceptible to oxyalkylation for reasons which are obscure. Where the non-hydroxylated amine contains a plurality of secondary amino groups, wherein one or more is susceptible to oxyalkylation, or primary amino groups, oxyalkylation may occur in those positions. Thus, in the case of the non-hydroxylated polyamines oxyalkylation may take place not only at the phenolic hydroxyl group but also at one or more of the available amino groups. Where the amine condensate is hydroxyalkylated, this latter group furnishes an additional position of oxyalkylation susceptibility.

The product formed in acylation will vary with the particular polyaminomethyl phenol employed. It may be an ester or an amide depending on the available reactive groups. If, however, after forming the amide at a temperature between 140°–250° C., but usually not above 200° C., one heats such products at a higher range, approximately 250–280° C., or higher, possibly up to 300° C. for a suitable period of time, for example, 1–2 hours or longer, one can in many cases recover a second mole of water for each mole of carboxylic acid employed, the first mole of water being evolved during amidification. The product formed in such cases is believed to contain a cyclic amidine ring such as an imidazoline or a tetrahydropyrimidine ring.

Ordinarily the methods employed for the production of amino imidazolines result in the formation of substantial amounts of other products such as amido imidazolines. However, certain procedures are well known by which the yield of amino imidazolines is comparatively high as, for example, by the use of a polyamine in which one of the terminal hydrogen atoms has been replaced by a low molal alkyl group or an hydroxyalkyl group, and by the use of salts in which the polyamine has been converted into a monosalt such as combination with hydrochloric acid or paratoluene sulfonic acid. Other procedures involve reaction with a hydroxyalkyl ethylene diamine and further treatment of such imidazoline having a hydroxyalkyl substituent with two or more moles of ethylene imine. Other well known procedures may be employed to give comparatively high yields.

Other very useful derivatives comprise acid salts and quaternary salts, derived therefrom. Since the compositions of this invention contain basic nitrogen groups, they are capable of reacting with inorganic acids, for example hydrohalogens (HCl, HBr, HI), sulfuric acid, phosphoric acid, etc., aliphatic acids, (acetic, propionic, glycolic, diglycolic, etc.) aromatic acids (benzoic, salicylic, phthalic, etc.) and organic compounds capable of forming salts, for example, those having the general formula RX wherein R is an organic group, such as an alkyl group (e.g. methyl, ethyl, propyl, butyl, octyl, nonyl, decyl, undecyl, dodecyl, tridecyl, pentadecyl, oleyl, octadecyl, etc.), cycloalkyl (e.g. cyclopentyl, cyclohexyl, etc.), aralkyl (e.g.

benzyl, etc.), and the like, and X is a radical capable of forming a salt such as those derived from acids (e.g. halide, sulfate, phosphate, sulfonate, etc., radicals). The preparation of these salts and quaternary compounds is well known to the chemical art. For example, they must be prepared by adding suitable acids (for example, any of those mentioned herein as acylating agents) to solutions of the basic composition or by heating such compounds as alkyl halides with these compositions. Diacid and quaternary salts can also be formed by reacting alkylene dihalides, polyacids, etc. The number of moles of acid and quaternary compounds that may react with the composition of this invention will, of course, depend on the number of basic nitrogen groups in the molecule. These salts may be represented by the general formula $N^+X^-$, wherein N comprises the part of the compound containing the nitrogen group which has been rendered positively charged by the H or R of the alkylating compound and X represents the anion derived from the alkylating compound.

THE METHYLOL PHENOL

As previously stated, the methylol phenols include monophenols and diphenols. The methylol groups on the phenol are either in one or two ortho positions or in the para position of the phenolic rings. The remaining phenolic ring positions are either unsubstituted or substituted with groups not interfering with the amine methylol condensation. Thus, the monophenols have 1, 2 or 3 methylol groups and the diphenols contain 1, 2, 3 or 4 methylol groups.

The following is the monophenol most advantageously employed:

This compound, 2,4,6-trimethylol phenol (TMP), is available commercially in 70% aqueous solutions. The designation TMP is sometimes used to designate trimethylol propane. Apparently no confusion is involved, in light of the obvious differences.

A second monophenol which can be advantageously employed is:

where R is an aliphatic saturated or unsaturated hydrocarbon having, for example, 1–30 carbon atoms, for example, methyl, ethyl, propyl, butyl, sec-butyl, tert-butyl, amyl, tert-amyl, hexyl, tert-hexyl, octyl, nonyl, decyl, dodecyl, octo-decyl, etc., the corresponding unsaturated groups, etc.

The third monophenol advantageously employed is:

where R comprises an aliphatic saturated or unsaturated hydrocarbon as stated above in the second monophenol, for example, that derived from cardanol or hydrocardanol.

The following are diphenol species advantageously employed:

One species is where R is hydrogen or a lower alkyl, preferably methyl.

A second species is where R has the same meaning as that of the second species of the monophenols and R′ is hydrogen or a lower alkyl, preferably methyl.

We can employ a wide variety of methylol phenols in the reaction, and the reaction appears to be generally applicable to the classes of phenols heretofore specified. Examples of suitable methylol phenols include:

Monophenols—
    2-methylol phenol
    2,6-dimethylol, 4-methyl phenol
    2,4,6-trimethylol phenol
    2,6-dimethylol, 4-cyclohexyl phenol
    2,6-dimethylol-4-phenyl phenol
    2,6-dimethylol-4-methoxyphenol
    2,6-dimethylol-4-chlorophenol
    2,6-dimethylol-3-methylphenol
    2,6-dimethylol-4-sec-butylphenol
    2,6-dimethylol,3,5-dimethyl-4-chlorophenol
    2,4,6-trimethylol,3-pentadecyl phenol
    2,4,6-trimethylol,3-pentadecadienyl phenol
Diphenols—

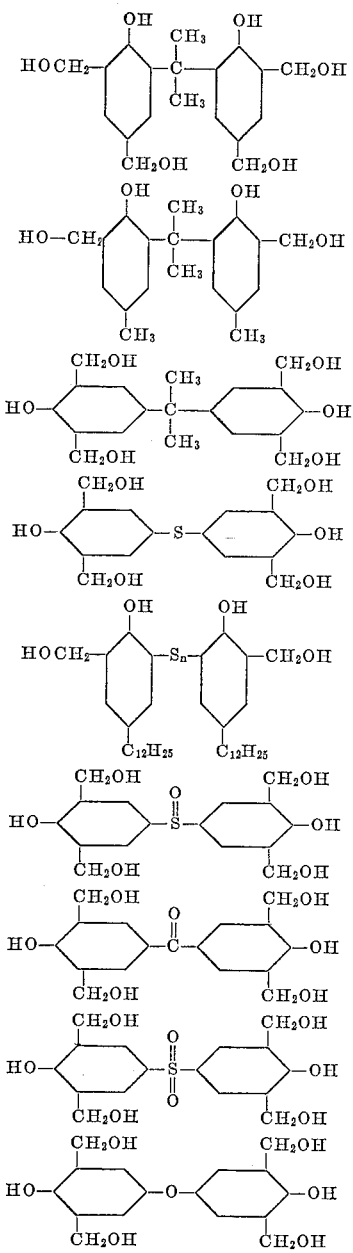

Examples of additional methylol phenols which can be employed to give the useful products of this invention are described in "The Chemistry of Phenolic Resins" by Robert W. Martin, Tables V and VI, pp. 32–39 (Wiley, 1956).

THE POLYAMINE

As noted previously, the general formula for the polyamine is

This indicates that a wide variety of reactive secondary polyamines can be employed, including aliphatic polyamines, cycloaliphatic polyamines, aromatic polyamines. (provided the aromatic polyamine has at least one secondary amine which has no negative group, such as a phenyl group directly bonded thereto) heterocyclic polyamines and polyamines containing mixtures of the above groups. Thus, the term "polyamine" includes compounds having one amino group on one kind of radical, for example, an aliphatic radical, and another amino group on the heterocyclic radical as in the case of the following formula:

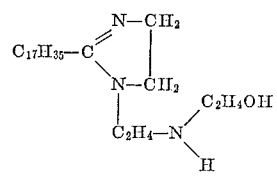

provided, of course, the polyamine has at least one secondary amino group capable of condensing with the methylol group. It also includes compounds which are totally heterocyclic, having a similarly reactive secondary amino group. It also includes polyamines having other elements besides carbon, hydrogen and nitrogen, for example, those also containing oxygen, sulfur, etc. As previously stated, the preferred embodiments of the present invention are the alkylene polyamines, the hydroxylated alkylene polyamines and the amino cyclic amidines.

Polyamines are available commercially and can be prepared by well-known methods. It is well known that olefin dichlorides, particularly those containing from 2 to 10 carbon atoms, can be reacted with ammonia or amines to give alkylene polyamines. If, instead of using ethylene dichloride, the corresponding propylene, butylene, amylene or higher molecular weight dichlorides are used, one then obtains the comparable homologues. One can also use alpha-omega dialkyl ethers such as $ClCH_2OCH_2Cl$; $ClCH_2CH_2OCH_2CH_2Cl$ and the like. Such polyamines can be alkylated in the manner commonly employed for alkylating monoamines. Such alkylation results in products which are symmetrically or non-symmetrically alkylated. The symmetrically alkylated polyamines are most readily obtainable. For instance, alkylated products can be derived by reaction between alkyl chlorides, such as propyl chloride, butyl chloride, amyl chlorides, cetyl chloride, and the like and a polyamine having one or more primary amino groups. Such reactions result in the formation of hydrochloric acid, and hence the resultant product is an amine hydrochloride. The conventional method for conversion into the base is to treat with dilute caustic solution. Alkylation is not limited to the introduction of an alkyl group, but as a matter of fact, the radical introduced can be characterized by a carbon atom chain interrupted at least once by an oxygen atom. In other words, alkylation is accomplished by compounds which are essentially alkyloxyalkyl chlorides, as, for example, the following:

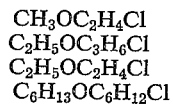

The reaction involving the alkylene dichlororides is not limited to ammonia, but also involves amines, such as ethylamine, propylamine, butylamine, octylamine, decylamine, cetylamine, dodecylamine, etc. Cycloaliphatic and aromatic amines are also reactive. Similarly, the reaction also involves the comparable secondary amines, in which various alkyl radicals previously mentioned appear twice and are types in which two dissimilar radicals appear, for instance, amyl butylamine, hexyl octylamine, etc. Furthermore, compounds derived by reactions involving alkylene dichlorides and a mixture of ammonia and amines, or a mixture of two different amines are useful. However, one need not employ a polyamine having an alkyl radical. For instance, any suitable polyalkylene polyamine, such as an ethylene polyamine, a propylene polyamine, etc., treated with ethylene oxide or similar oxyalkylating agent are useful. Furthermore, various hydroxylated amines, such as monoethanolamine, monopropanolamine, and the like, are also treated with a suitable alkylene dichloride, such as ethylene dichloride, propylene dichloride, etc.

As to the introduction of a hydroxylated group, one can use any one of a number of well-known procedures such as alkylation, involving a chlorhydrin, such as ethylene chlorhydrin, glycerol chlorhydrin, or the like. Such reactions are entirely comparable to the alkylation reaction involving alkyl chlorides previously described. Other reactions involve the use of an alkylene oxide, such as ethylene oxide, propylene oxide, butylene oxide, octylene oxide, styrene oxide or the like. Glycide is advantageously employed. The type of reaction just referred to is well known and results in the introduction of a hydroxylated or polyhydroxylated radical in an amino hydrogen position. It is also possible to introduce a hydroxylated oxyhydrocarbon atom; for instance, instead of using the chlorhydrin corresponding to ethylene glycol, one employs the chlorhydrin corresponding to diethylene glycol. Similarly, instead of using the chlorhydrin corresponding to glycerol, one employs the chlorhydrin corresponding to diglycerol.

From the above description it can be seen that many of the above polyamines can be characterized by the general formula

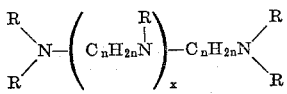

where the R's, which are the same or different, comprise hydrogen, alkyl, cycloalkyl, aryl, alkyloxyalkyl, hydroxylated alkyl, hydroxylated alkyloxyalkyl, etc., radicals, $x$ is zero or a whole number of at least one, for example 1 to 10, but preferably 1 to 3, provided the polyamine contains at least one secondary amino group, and $n$ is a whole number, 2 or greater, for example 2–10, but preferably 2–5. Of course, it should be realized that the amino or hydroxyl group may be modified by acylation to form amides, esters or mixtures thereof, prior to the methylolamino condensation provided at least one active secondary amine group remains on the molecule. Any of the suitable acylating agents herein described may be employed in this acylation. Prior acylation of the amine can advantageously be used instead of acylation subsequent to amine condensation.

A particularly useful class of polyamines is a class of branched polyamines. These branched polyamines are polyalkylene polyamines wherein the branched group is a side chain containing on the average at least one nitrogen-bonded aminoalkylene, i.e.

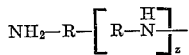

group per nine amino units present on the main chain, for example 1–4 of such branched chains per nine units on the main chain, but preferably one side chain unit per nine main chain units. Thus, these polyamines contain at least three primary amino groups and at least one tertiary amino group in addition to at least one secondary amino group.

These branched polyamines may be expressed by the formula

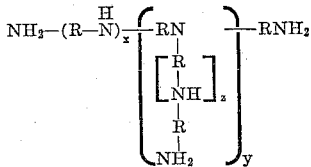

wherein R is an alkylene group such as ethylene, propylene, butylene and other homologues (both straight chained and branched), etc., but preferably ethylene; and $x$, $y$ and $z$ are integers, $x$ being for example, from 4 to 24 or more but preferably 6 to 18 $y$ being for example 1 to 6 or more but preferably 1 to 3, and $z$ being for example 0–6 but preferably 0–1. The $x$ and $y$ units may be sequential, alternative, orderly or randomly distributed.

The preferred class of branched polyamines includes those of the formula

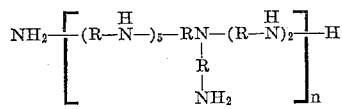

where $n$ is an integer, for example 1–20 or more but preferably 1–3, wherein R is preferably ethylene, but may be propylene, butylene, etc. (straight chained or branched).

The particularly preferred branched polyamines are presented by the following formula:

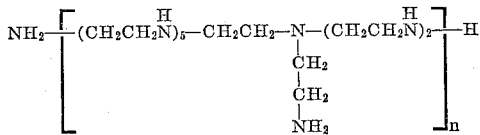

($n=1–3$)

The radicals in the brackets may be joined in a head-to-head or a head-to-tail fashion. Compounds described by this formula wherein $n=1–3$ are manufactured and sold by Dow Chemical Company as polyamines N–400, N–800, N–1200, etc. Polyamine N–400 has the above formula wherein $n=1$ and was the branched polyamine employed in all of the specific examples.

The branched polyamines can be prepared by a wide variety of methods. One method comprises the reaction of ethanolamine and ammonia under pressure over a fixed bed of a metal hydrogenation catalyst. By controlling the conditions of this reaction one can obtain various amounts of piperazine and polyamines as well as the branched chain polyalkylene polyamine. This process is described in Australian Patent No. 42,189 and in the East German Patent 14,480 (March 17, 1958) reported in Chem. Abstracts, August 10, 1958, 14,129.

The branched polyamines can also be prepared by the following reactions:

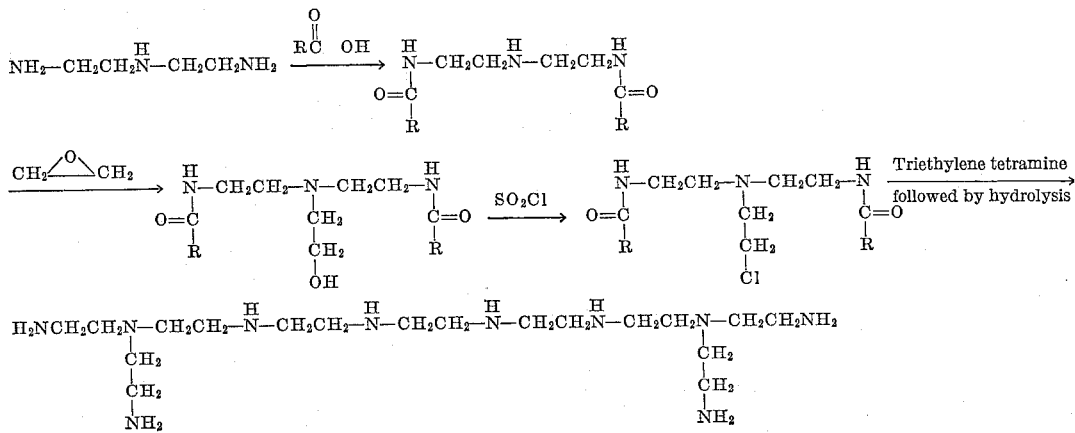

Variations on the above procedure can produce other branched polyamines.

The branched nature of the polyamine imparts unusual properties to the polyamine and its derivatives. Cyclic aliphatic polyamines having at least one secondary amino group such as piperazine, etc., can also be employed.

It should be understood that diamines containing a secondary amino group may be employed. Thus, where x in the linear polyalkylene amine is equal to zero, at least one of the R's would have to be hydrogen, for example, a compound of the following formula:

$$\begin{array}{c} C_{18}H_{37} \\ | \\ N-CH_2-CH_2-NH_2 \\ | \\ H \end{array}$$

Suitable polyamines also include polyamines wherein the alkylene group or groups are interrupted by an oxygen radical, for example, $$\begin{array}{c} R \\ \diagdown \\ R \end{array} N - \left( C_nH_{2n}OC_nH_{2n}\overset{R}{\underset{|}{N}} \right)_x - C_nH_{2n}OC_nH_{2n}N \begin{array}{c} \diagup R \\ \diagdown R \end{array}$$

or mixtures of these groups and alkylene groups, for example, $$\begin{array}{c} R \\ \diagdown \\ R \end{array} N - \left( C_nH_{2n}OC_nH_{2n}\overset{R}{\underset{|}{N}} \right)_x - C_nH_{2n}N \begin{array}{c} \diagup R \\ \diagdown R \end{array}$$

where R, n and x has the meaning previously stated for the linear polyamine.

For convenience the aliphatic polyamines have been classified as nonhydroxylated and hydroxylated alkylene polyamino amines. The following are representative members of the nonhydroxylated series:

Diethylene triamine,
Dipropylene triamine,
Dibutylene triamine, etc.,
Triethylene tetramine,
Tripropylene tetramine,
Tributylene tetramine, etc.,
Tetraethylene pentamine,
Tetrapropylene pentamine,
Tetrabutylene pentamine, etc.,
Mixtures of the above,
Mixed ethylene, propylene, and/or butylene, etc., polyamines and other members of the series, The above polyamines modified with higher molecular weight aliphatic groups, for example, those having from 8–30 or more carbon atoms, a typical example of which is $$NH_2-C_2H_4\overset{H}{N}-C_2H_4-\overset{H}{N}-C_2H_4\overset{H}{N}-C_{16}H_{33}$$

where the aliphatic group is derived from any suitable source, for example, from compounds of animal or vegetable origin, such as coconut oil, tallow, tall oil, soya, etc., are very useful. In addition, the polyamine can contain other alkylene groups, fewer amino groups, additional higher aliphatic groups, etc., provided the polyamine has at least one reactive secondary amino group. Compositions of this type are described in U.S. Patent 2,267,205.

Other useful aliphatic polyamines are those containing substituted groups on the chain, for example, aromatic groups, heterocyclic groups, etc., such as a compound of the formula $$R-\overset{H}{N}-(ZNH)_xH$$

where R is alkyl and Z is an alkylene group containing phenyl groups on some of the alkylene radicals since the phenyl group is not attached directly to the secondary amino group.

In addition, the alkylene group substituted with a hydroxy group $$NH_2-CH_2CH-CH_2-\overset{H}{N}-CH_2-CH-CH_2NH_2$$
$$\qquad\qquad |\qquad\qquad\qquad\qquad |$$
$$\qquad\qquad OH\qquad\qquad\qquad\quad OH$$

is reactive.

Polyamines containing aromatic groups in the main part of the chain are useful, for example, N,N′-dimethyl-p-xylylenediamine.

Examples of polyamines containing solely secondary amino groups include the following:

$$\begin{array}{c} CH_3 \\ \diagdown \\ H \end{array} N C_2H_4 \overset{H}{N} C_2H_4 N \begin{array}{c} \diagup CH_3 \\ \diagdown H \end{array}$$

$$\begin{array}{c} C_2H_5 \\ \diagdown \\ H \end{array} N C_2H_5 \overset{H}{N} C_2H_4 N \begin{array}{c} \diagup C_2H_5 \\ \diagdown H \end{array}$$

$$\begin{array}{c} CH_3 \\ \diagdown \\ H \end{array} N C_2H_4 O C_2H_4 N \begin{array}{c} \diagup CH_3 \\ \diagdown H \end{array}$$

$$\begin{array}{c} C_2H_5 \\ \diagdown \\ H \end{array} N C_2H_4 O C_2H_4 N \begin{array}{c} \diagup C_2H_5 \\ \diagdown H \end{array}$$

$$\begin{array}{c} CH_3 \\ \diagdown \\ H \end{array} N C_3H_6 \overset{H}{N} C_3H_6 N \begin{array}{c} \diagup CH_3 \\ \diagdown H \end{array}$$

$$\begin{array}{c} CH_3 \\ \diagdown \\ H \end{array} N C_2H_4 \overset{H}{N} C_2H_4 \overset{H}{N} C_2H_4 N \begin{array}{c} \diagup CH_3 \\ \diagdown H \end{array}$$

$$\begin{array}{c} CH_3 \\ \diagdown \\ H \end{array} N C_2H_4 \overset{H}{N} C_2H_4 \overset{H}{N} C_2H_4 \overset{H}{N} C_2H_4 N \begin{array}{c} \diagup CH_3 \\ \diagdown H \end{array}$$

$$(CH_3)_2N C_2H_4\overset{H}{N} C_2H_4\overset{H}{N} C_2H_4\overset{H}{N} C_2H_4 N(CH_3)_2$$

Examples of polyamines having hydroxylated groups include the following:

$$\begin{array}{c} CH_3 \\ \diagdown \\ HOC_2H_4 \end{array} N C_2H_4 \overset{H}{N} C_2H_4 N \begin{array}{c} \diagup CH_3 \\ \diagdown C_2H_4OH \end{array}$$

$$(HOC_2H_4)_2N C_2H_4\overset{H}{N} C_2H_4 N(C_2H_4OH)_2$$

$$\begin{array}{c} C_2H_5 \\ \diagdown \\ HOC_2H_4 \end{array} N C_2H_4 \overset{H}{N} C_2H_4 N \begin{array}{c} \diagup C_2H_5 \\ \diagdown C_2H_4OH \end{array}$$

$$\begin{array}{c} CH_3 \\ \diagdown \\ HOC_2H_4 \end{array} N C_3H_6 \overset{H}{N} C_3H_6 N \begin{array}{c} \diagup CH_3 \\ \diagdown C_2H_4OH \end{array}$$

$$\begin{array}{c} CH_3 \\ \diagdown \\ HOC_2H_4 \end{array} N C_2H_4 \overset{H}{N} C_2H_4 \overset{H}{N} C_2H_4 N \begin{array}{c} \diagup CH_3 \\ \diagdown C_2H_4OH \end{array}$$

$$\begin{array}{c} CH_3 \\ \diagdown \\ HOC_2H_4 \end{array} N C_2H_4 \overset{H}{N} C_2H_4 \overset{H}{N} C_2H_4 \overset{H}{N} C_2H_4 N \begin{array}{c} \diagup CH_3 \\ \diagdown C_2H_4OH \end{array}$$

$$\begin{array}{c} HOC_2H_4 \\ \diagdown \\ CH_3 \end{array} N C_2H_4 \overset{H}{N} C_2H_4 \overset{H}{N} C_2H_4 \overset{H}{N} C_2H_4 N \begin{array}{c} \diagup C_2H_4OH \\ \diagdown CH_3 \end{array}$$

Suitable cyclic amidines include $$R-C\begin{array}{c} \diagup N-CH_2 \\ \diagdown \\ N-CH_2 \\ | \\ H \end{array}$$

$$R-C\begin{matrix}N-CH_2\\ \\N-CH_2\end{matrix}$$
$$\quad\quad\quad\quad C_2H_4-NH-C_2H_4-NH_2$$

$$R-C\begin{matrix}N-CH-CH_3\\ \\ \quad\quad CH_2\\N-CH_2\end{matrix}$$
$$\quad\quad\quad\quad C_2H_4-NH-C_2H_4-NH_2$$

$$R-C\begin{matrix}N-CH_2\ CH_2-N\\ \\N-CH_2\ CH_2-N\end{matrix}C-R$$
$$\quad\quad C_2H_4\quad\quad N\quad\quad C_2H_4$$
$$\quad\quad\quad\quad\quad\ H$$

$$R-C\begin{matrix}N-CH_2\\ \\N-CH_2\end{matrix}$$
$$\ C_2H_4-NH-C_2H_4-NH-C_2H_4-N\begin{matrix}CH_3\\ \\CH_3\end{matrix}$$

$$\begin{matrix}CH_2---CH_2\\ |\quad\quad\quad |\\ N\quad\quad NH\\ \diagdown\ \diagup\\ C\\ |\\ HNR\end{matrix}$$

wherein R is a hydrocarbon group, $$\begin{matrix}CH_2---CH_2\\ |\quad\quad\quad |\\ N\quad\quad NH\\ \diagdown\ \diagup\\ C\\ |\\ HN(CH_2NH)_xH\end{matrix}$$

where $x=1-5$.

2-undecylimidazoline
2-heptadecylimidazoline
2-oleylimidazoline
1-N-decylaminoethyl, 2-ethylimidazoline
2-methyl, 1-hexadecylaminoethylaminoethylimidazoline
1-dodecylaminopropylimidazoline
1-(stearoyloxyethyl)aminoethylimidazoline
1-stearamidoethylaminoethylimidazoline
2-heptadecyl, 4,5-dimethylimidazoline
1-dodecylaminohexylimidazoline
1-stearoyloxyethylaminohexylimidazoline
2-heptadecyl, 1 - methylaminoethyl tetrahydropyrimidine
4-methyl, 2-dodecyl, 1-methylaminoethylaminoethyl tetrahydropyrimidine $$C_{17}H_{35}C\begin{matrix}N-CH_2\\ \\N-CH_2\ C_2H_4OH\\ \quad\ \diagup\\ C_2H_4N\\ \diagdown\\ \quad\ H\end{matrix}$$

As previously stated, there must be reacted at least one mole of polyamine per equivalent of methylol group. The upper limit to the amount of amine present will be determined by convenience and economics, for example, 1 or more moles of polyamine per equivalent of methylol group can be employed.

The following examples are illustrative of the preparation of the polyaminomethylol phenol condensate and are not intended for purposes of limitation.

The following general procedure is employed in preparing the polyamine-methylol condensate. The methylol-phenol is generally mixed or slowly added to the polyamine in ratios of 1 mole of polyamine per equivalent of methylol group on the phenol. However, where the polyamine is added to the methylolphenol, addition is carried out below 60° C. until at least one mole of polyamine per methylol group has been added. Enough of a suitable azeotroping agent is then added to remove water (benzene, toluene, or xylene) and heat applied. After removal of the calculated amount of water from the reaction mixture (one mole of water per equivalent of methylol group) heating is stopped and the azeotroping agent is evaporated off under vacuum. Although the reaction takes place at room temperature, higher temperatures are required to complete the reaction. Thus, the temperature during the reaction generally varies from 80–160° C. and the time from 4–24 hours. In general, the reaction can be effected in the lower time range employing higher temperatures. However, the time test of completion of reaction is the amount of water removed.

*Example 1a*

This example illustrates the reaction of a methylol-monophenol and a polyamine. A liter flask is employed with a conventional stirring device, thermometer phase separating trap condenser heating mantle, etc. 70% aqueous 2,4,6-trimethylol phenol which can be prepared by conventional procedures or purchased in the open market, in this instance, the latter, is employed. The amount used is one gram mole, i.e. 182 grams, of anhydrous trimethylol phenol in 82 grams of water. This represents three equivalents of methylol groups. This solution is added dropwise with stirring to three gram moles (309 grams) of diethylene triamine dissolved in 100 ml. of xylene over about 30 minutes. An exothermic reaction takes place at this point but the temperature is maintained below approximately 60° C. The temperature is then raised so that distillation takes place with the removal of the predetermined amount of water, i.e., the water of solution as well as water of reaction. The water of reaction represents 3 gram moles or 54 grams.

The entire procedure including the initial addition of the trimethylol phenol until the end of the reaction is approximately 6 hours. At the end of the reaction period the xylene is removed, using a vacuum of approximately 80 mm. The resulting product is a viscous water-soluble liquid of a dark red color.

*Example 28a*

This example illustrates the reaction of a methylol-monphenol and a branched polyamine. A one liter flask is employed equipped with a conventional stirring device, thermometer, phase separating trap, condenser, heating mantle, etc. Polyamine N–400, 200 grams (0.50 mole), is placed in the flask and mixed with 150 grams of xylene. To this stirred mixture is added dropwise over a period of 15 minutes 44.0 grams (0.17 mole) of a 70% aqueous solution of 2,4,6-trimethylol phenol. There is no apparent temperature change. The reaction mixture is then heated to 140° C., refluxed 45 minutes, and 24 milliliters of water is collected (the calculated amount of water is 22 milliliters). The product is a dark brown liquid (as a 68% xylene solution).

*Example 2d*

This example illustrates the reaction of a methylol diphenol.

One mole of substantially water-free $$HO-\overset{\underset{CH_2OH}{|}}{\underset{\underset{CH_2OH}{|}}{\bigcirc}}-\overset{\underset{CH_3}{|}}{\underset{\underset{CH_3}{|}}{C}}-\overset{\underset{CH_2OH}{|}}{\underset{\underset{CH_2OH}{|}}{\bigcirc}}-OH$$

and 4 moles of triethylene tetramine in 300 ml. of xylene are mixed with stirring. Although an exothermic reaction takes place during the mixing, the temperature is maintained below 60° C. The reaction mixture is then heated and azeotroped until the calculated amount (72 g.) of water is removed (4 moles of water of reaction). The maximum temperature is 150° C. and the total reaction time is 8 hours. Xylene is then removed under vacuum. The product is a viscous water-soluble liquid.

Example 5b

In this example, 1 mole of substantially water-free

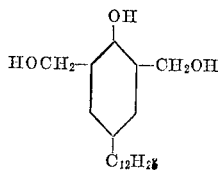

is reacted with 2 moles of Duomeen S (Armour Co.), $$R-\overset{H}{N}-CH_2CH_2CH_2NH_2$$

where R is a fatty group derived from soya oil, in the manner of Example 2a. Xylene is used as both solvent and azeotroping agent. The reaction time is 8 hours and the maximum temperature 150–160° C.

Example 28b

This experiment is carried out in the same equipment as is employed in Example 28a except that a 300 milliliter flask is used. Into the flask is placed 50 grams of xylene and 8.4 grams (0.05 mole) of 2,6-dimethylol-4-methylphenol are added. The resulting slurry is stirred and warmed up to 80° C. Polyamine N-400, 40.0 grams (0.10 mole), is added slowly over a period of 45 minutes. Solution takes place upon the addition of the polyamine. The reaction mixture is refluxed for about 4 hours at 140° C. and 1.8 milliliters of water is collected, the calculated amount. The product, as a xylene solution, is a brown liquid.

Example 29b

This experiment is carried out in the same equipment and in the same manner as is employed in Example 28b. To a slurry of 10.5 grams (0.05 mole) of 2,6-dimethylol-4-tertiarybutylphenol in 50 grams of xylene, 40 grams (0.10 mole) of polyamine N-400 are added all at once with stirring and the mixture is heated and refluxed at 140° C. for 4 hours with the collection of 1.6 milliliters of water. The calculated amount of water is 1.8 milliliters. The product, as a xylene solution, is reddish brown.

Example 30b

This experiment is carried out in the same equipment and in the same manner as is employed in Example 28b. To a slurry of 14.0 grams of 2,6-dimethylol-4-nonylphenol in 50 milliliters of benzene, 40.0 grams (0.10 mole) of polyamine N-400 are added all at once with stirring and the mixture is heated and refluxed at 140° C. for 6 hours with the collection of 1.8 milliliters of water. The calculated amount of water is 1.8 milliliters. The product, as a xylene solution, is dark brown.

The following amino-methylol condensates shown in Tables I-IV are prepared in the manner of Examples 1a, 2d, and 5b. In each case one mole of polyamine per equivalent of methylol group on the phenol is reacted and the reaction carried out until, taking into consideration the water originally present, about one mole of water is removed for each equivalent of methylol group present on the phenol.

The pH of the reaction mixture is determined solely by the reactants (i.e., no inorganic base, such as Ca(OH)$_2$, NaOH, etc. or other extraneous catalyst is present). Examples 1a, 2d, and 5b are also shown in the tables. Attempts are made in the examples to employ commercially available materials where possible.

In the following tables the examples will be numbered by a method which will describe the nature of the product. The polyamine-methylol condensate will have a basic number, for example, 1a, 4b, 6c, 4d, wherein those in the A series are derived from TMP, the B series from DMP, the C series from trimethylol cardanol and side chain hydrogenated cardanol (i.e., hydrocardanol), and the d series from the tetramethylol diphenols. The basic number always refers to the same amino condensate. The symbol A before the basic number indicates that the polyamine had been acylated prior to condensation. The symbol A after the basic number indicates that acylation takes place after condensation.

A25a means that the 25a (amino condensate) was prepared from an amine which had been acylated prior to condensation. However, 10aA means that the condensate was acylated after condensation. The symbol O indicates oxyalkylation. Thus 10aAO indicates that the amine condensate 10a has been acylated (10aA), followed by oxyalkylation. 10aAOA means that the same condensate, 10a, has been acylated (10aA), then oxyalkylated (10aAO) and then acylated. In other words, these symbols indicate both kind and order of treatment.

TABLE I

Reaction of

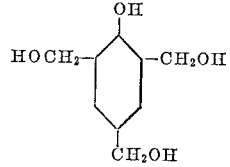

(designated TMP) and polyamines.

[Molar ratio TMP to amine 1:3]

| Example | Polyamine |
|---|---|
| 1a | Diethylene triamine. |
| 2a | Triethylene tetramine. |
| 3a | Tetraethylene pentamine. |
| 4a | Dipropylene triamine. |
| 5a | Duomeen S (Armour Co.) $R-\overset{H}{N}-CH_2CH_2CH_2NH_2$ (R derived from soya oil) |
| 6a | Duomeen T (Armour Co.) $R-\overset{H}{N}-CH_2CH_2CH_2NH_2$ (R derived from tallow) |
| 7a | Oxyethylated Duomeen S $R-\overset{H}{N}-CH_2CH_2CH_2N\diagup^{C_2H_4OH}_{\diagdown H}$ |
| 8a | Oxyethylated Duomeen T $R-\overset{H}{N}-CH_2CH_2CH_2N\diagup^{C_2H_4OH}_{\diagdown H}$ |
| 9a | Amine ODT (Monsanto) $C_{12}H_{25}-\overset{H}{N}-C_2H_4\overset{H}{N}-C_2H_4NH_2$ |
| 10a | Oxyethylated Amine ODT $C_{12}H_{25}-\overset{H}{N}-C_2H_4\overset{H}{N}-C_2H_4N\diagup^{C_2H_4OH}_{\diagdown H}$ |
| 11a | N-(2-hydroxyethyl)-2-methyl-1,2-propanediamine. |
| 12a | N-methyl ethylene diamine. |
| 13a | N,N'-dimethyl ethylene diamine. |
| 14a | Hydroxyethyl ethylene diamine. |
| 15a | N,N'-dihydroxyethylethylene diamine. |
| 16a | N-methyl propylene diamine. |
| 17a | N,N'-dihydroxyethyl propylene diamine. |
| 18a | N,N'-dihydroxypropyl propylene diamine. |
| 19a | $HOC_2H_4-\overset{H}{N}C_2H_4O-C_2H_4O-C_2H_4N\diagup^{C_2H_4OH}_{\diagdown H}$ |
| 20a | $C_{17}H_{33}C\diagup^{N-CH_2}_{\diagdown N-CH_2}$ with H on lower N |
| 21a | $CH_3C\diagup^{N-CH_2}_{\diagdown N-CH_2}$ $\mid$ $C_2H_4-\overset{H}{N}-C_2H_4\overset{H}{N}-C_{16}H_{33}$ |

TABLE III—Continued

| Example | R' Derived from— | Polyamine |
|---|---|---|
| 6c | Hydrogenated Cardanol. | Duomeen T (Armour Co.) $$R-\overset{H}{N}-CH_2CH_2CH_2NH_2$$ (R derived from tallow) |
| 7c | Cardanol | Oxyethylated Duomeen S $$R-\overset{H}{N}-CH_2CH_2CH_2N\begin{smallmatrix}C_2H_4OH\\ \\H\end{smallmatrix}$$ |
| 8c | Hydrogenated Cardanol. | Oxyethylated Duomeen T $$R-\overset{H}{N}-CH_2CH_2CH_2N\begin{smallmatrix}C_2H_4OH\\ \\H\end{smallmatrix}$$ |
| 9c | Cardanol | Amine ODT (Monsanto) $$C_{12}H_{25}-\overset{H}{\underset{H}{N}}-C_2H_4N-C_2H_4NH_2$$ |
| 10c | Hydrogenated Cardanol. | Oxyethylated Amine ODT $$C_{12}H_{25}-\overset{H}{\underset{H}{N}}-C_2H_4N-C_2H_4N\begin{smallmatrix}C_2H_4OH\\ \\H\end{smallmatrix}$$ |
| 11c | Cardanol | N-(2-hydroxyethyl)-2-methyl-1,2-propanediamine. |
| 12c | Hydrogenated Cardanol. | N-methyl ethylene diamine. |

The products formed in the above Table III are dark, viscous liquids.

TABLE IV

Reaction of

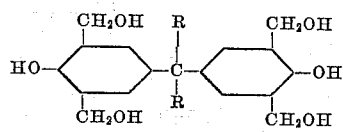

[Molar ratio of tetramethylol diphenol to polyamine 1:4]

| Example | R | Polyamine |
|---|---|---|
| 1d | Hydrogen | Diethylene triamine. |
| 2d | do | Triethylene tetramine. |
| 3d | do | Tetraethylene pentamine. |
| 4d | do | Dipropylene triamine. |
| 5d | do | Duomeen S (Armour Co.) $$R-\overset{H}{N}-CH_2CH_2CH_2NH_2$$ (R derived from soya oil) |
| 6d | do | Duomeen T (Armour Co.) $$R-\overset{H}{N}-CH_2CH_2CH_2NH_2$$ (R derived from tallow) |
| 7d | do | Oxyethylated Duomeen S $$R-\overset{H}{N}-CH_2CH_2CH_2N\begin{smallmatrix}C_2H_4OH\\ \\H\end{smallmatrix}$$ |
| 8d | do | Oxyethylated Duomeen T $$R-\overset{H}{N}-CH_2CH_2CH_2N\begin{smallmatrix}C_2H_4OH\\ \\H\end{smallmatrix}$$ |
| 9d | do | Amine ODT (Monsanto) $$C_{12}H_{25}-\overset{H}{\underset{H}{N}}-C_2H_4N-C_2H_4NH_2$$ |
| 10d | do | Oxyethylated Amine ODT $$C_{12}H_{25}-\overset{H}{\underset{H}{N}}-C_2H_4N-C_2H_4N\begin{smallmatrix}C_2H_4OH\\ \\H\end{smallmatrix}$$ |
| 11d | Hydrogen | N-(2-hydroxyethyl)-2-methyl-1,2-propanediamine. |
| 12d | do | N-methyl ethylene diamine. |
| 13d | Methyl | Diethylene triamine. |
| 14d | do | Triethylene tetramine. |
| 15d | do | Tetraethylene pentamine. |
| 16d | do | Dipropylene triamine. |
| 17d | do | Duomeen S (Armour Co.) $$R-\overset{H}{N}-CH_2CH_2CH_2NH_2$$ (R derived from soya oil) |
| 18d | do | Duomeen T (Armour Co.) $$R-\overset{H}{N}-CH_2CH_2CH_2NH_2$$ (R derived from tallow) |
| 19d | do | Oxyethylated Duomeen S $$R-\overset{H}{N}-CH_2CH_2CH_2N\begin{smallmatrix}C_2H_4OH\\ \\H\end{smallmatrix}$$ |
| 20d | do | Oxyethylated Duomeen T $$R-\overset{H}{N}-CH_2CH_2CH_2N\begin{smallmatrix}C_2H_4OH\\ \\H\end{smallmatrix}$$ |
| 21d | do | Amine ODT (Monsanto) $$C_{12}H_{25}-\overset{H}{\underset{H}{N}}-C_2H_4N-C_2H_4HN_2$$ |
| 22d | do | Oxyethylated Amine ODT $$C_{12}H_{25}-\overset{H}{\underset{H}{N}}-C_2H_4N-C_2H_4N\begin{smallmatrix}C_2H_4OH\\ \\H\end{smallmatrix}$$ |
| 23d | do | N-(2-hydroxyethyl)-2-methyl-1,2-propanediamine. |
| 24d | do | N-methyl ethylene diamine. |

The products formed in the above Table IV are dark, viscous liquids.

THE ACYLATING AGENT

As in the reaction between the methylol phenol and the secondary amine, acylation is also carried out under dehydrating conditions, i.e., water is removed. Any of the well-known methods of acylation can be employed. For example, heat alone, heat and reduced pressure, heat in combination with an azeotroping agent, etc., are all satisfactory.

A wide variety of acylating agents can be employed. However, strong acylating agents such as acyl halides, or acid anhydrides should be avoided since they are capable of esterifying phenolic hydroxy groups, a feature which is undesirable.

Although a wide variety of carboxylic acids produce excellent products, in our experience monocarboxy acids having more than 6 carbon atoms and less than 40 carbon atoms give most advantageous products. The most common examples include the detergent forming acids, i.e., those acids which combine with alkalies to produce soap or soap-like bodies. The detergent-forming acids, in turn, include naturally-occurring fatty acids, resin acids, such as abietic acid, naturally occurring petroleum acids, such as naphthenic acids, and carboxy acids, produced by the oxidation of petroleum. As will be subsequently indicated, there are other acids which have somewhat similar characteristics and are derived from somewhat different sources and are different in structure, but can be included in the broad generic term previously indicated.

Suitable acids include straight chain and branched chain, saturated and unsaturated, aliphatic, alicyclic, fatty, aromatic, hydroaromatic, and aralkyl acids, etc.

Examples of saturated aliphatic monocarboxylic acids are acetic, propionic, butyric, valeric, caproic, heptanoic, TABLE I—Continued

| Example | Polyamine |
|---|---|
| 22a | $C_{17}H_{35}-C$ with imidazoline ring N-CH$_2$, N-CH$_2$, CH$_2$, N-substituent C$_2$H$_4$N(CH$_3$)H |
| 23a | $C_{17}H_{35}-C$ imidazoline with N-C$_2$H$_4$N(C$_2$H$_4$OH)H substituent |
| 24a | $C_4H_9C$ imidazoline with N-H |
| A25a | Oleic acid prior acylated triethylene tetramine (1:1 molar ratio). |
| A26a | Stearic acid prior acylated tetraethylene pentamine (1:1 molar ratio). |
| A27a | Lauric acid prior acylated tetraethylene pentamine (1:1 molar ratio). |
| 28a | Polyamine N-400. |

The products formed in the above Table I are dark, viscous liquids.

TABLE II

Reaction of

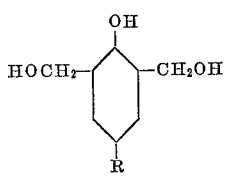

(designated DMP) with polyamines.

[Molar ratio DMP/amine 1:2]

| Example | R | Polyamine |
|---|---|---|
| 1b | Dodecyl | Diethylene triamine. |
| 2b | Octadecyl | Triethylene tetramine. |
| 3b | Sec-butyl | Tetraethylene pentamine. |
| 4b | Dodecyl | Dipropylene triamine. |
| 5b | do | Duomeen S (Armour Co.) $R-\overset{H}{N}-CH_2CH_2CH_2NH_2$ (R derived from soya oil) |
| 6b | Octadecyl | Duomeen T (Armour Co.) $R-\overset{H}{N}-CH_2CH_2CH_2NH_2$ (R derived from tallow) |
| 7b | Mixed sec and tertbutyl | Oxyethylated Duomeen S $R-\overset{H}{N}-CH_2CH_2CH_2N(C_2H_4OH)H$ |
| 8b | Dodecyl | Oxyethylated Duomeen T $R-\overset{H}{N}-CH_2CH_2CH_2N(C_2H_4)_2$ |
| 9b | Tert-butyl | Amine ODT (Monsanto) $C_{12}H_{25}-\overset{H}{N}-C_2H_4N-C_2H_4NH_2$ |
| 10b | do | Oxyethylated amine ODT $C_{12}H_{25}-\overset{H}{N}-C_2H_4\overset{H}{N}-C_2H_4N(C_2H_4OH)H$ |
| 11b | Octadecyl | N-(2-hydroxyethyl)-2-methyl-1,2 propanediamine. |
| 12b | Dodecyl | N-methyl ethylene diamine. |
| 13b | do | N,N'-dimethyl ethylene diamine. |
| 14b | do | Hydroxyethyl ethylene diamine. |
| 15b | do | N,N'-dihydroxyethylethylene diamine. |
| 16b | do | N-methyl propylene diamine. |
| 17b | Octadecyl | N,N'-dihydroxyethyl propylene diamine. |
| 18b | do | N,N'-dihydroxypropyl propylene diamine. |
| 19b | Tert butyl | $HOC_2H_4-\overset{H}{N}C_2H_4O-C_2H_4O-C_2H_4-N(C_2H_4OH)H$ |
| 20b | do | $C_{17}H_{33}C$ imidazoline (N-CH$_2$, N-CH$_2$, NH) |
| 21b | do | $CH_3C$ imidazoline with N-C$_2$H$_4$-N(H)-C$_2$H$_4$N(H)-C$_{19}H_{33}$ |
| 22b | do | $C_{17}H_{35}-C$ imidazoline with C$_2$H$_4$N(CH$_3$)H |
| 23b | do | $C_{17}H_{35}-C$ imidazoline with C$_2$H$_4$N(C$_2$H$_4$OH)H |
| 24b | Dodecyl | $C_4H_9C$ imidazoline N-H |
| A25b | do | Oleic acid prior acylated triethylene tetramine (1:1 molar ratio). |
| A-26b | do | Stearic acid prior acylated tetraethylene pentamine (1:1 molar ratio). |
| A27b | do | Lauric acid prior acylated tetraethylene pentamine (1:1 molar ratio). |
| 28b | Methyl | Polyamine N-400. |
| 29b | Tert butyl | Do. |
| 30b | Nonyl | Do. |

The products formed in the above Table II are dark viscous liquids.

TABLE III

Reaction of

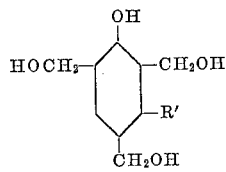

trimethylol cardanol and side chain hydrogenated cardanol) with polyamines.

[Molar ratio of the trimethylol cardanol to amine 1:3]

| Example | R' Derived from— | Polyamine |
|---|---|---|
| 1c | Cardanol | Diethylene triamine. |
| 2c | do | Triethylene tetramine. |
| 3c | Hydrogenated Cardanol | Tetraethylene pentamine. |
| 4c | do | Dipropylene triamine. |
| 5c | do | Duomeen S (Armour Co.) $R-\overset{H}{N}-CH_2CH_2CH_2NH_2$ (R derived from soya oil) | caprylic, nonanoic, capric, undecanoic, lauric, tridecanoic, myristic, pentadecanoic, palmitic, heptadecanoic, stearic, nonadecanoic, eicosanoic, heneicosanic, docosanoic, tricosanoic, tetracosanoic, pentacosanoic, cerotic, heptacosanoic, montanic, nonacosanoic, melissic and the like.

Examples of ethylenic unsaturated aliphatic acids are acrylic, methacrylic, crotonic, angelic, teglic, the pentenoic acids, the hexanoic acids, for example, hydrosorbic acid, the heptenoic acids, the octenoic acids, the nonenoic acids, the decenoic acids, for example, obtusilic acid, the undecenoic acids, the dodecenoic acids, for example, lauroleic, linderic, etc., the tridecenoic acids, the tetradecenoic acids, for example, myristoleic acid, the pentadecenoic acids, the hexadecenoic acids, for example, palmitoleic acid, the heptadecenoic acids, the octodecenoic acids, for example, petrosilenic acid, oleic acid, elardic acid, the nonadecenoic acids, for example, the eicosenoic acids, the docosenoic acids, for example, erucic acid, brassidic acid, cetoleic acid, the tetracosenoic acids, and the like.

Examples of dienoic acids are the pentadienoic acids, the hexadienoic acids, for example, sorbic acid, the octadienoic acids, for example, linoleic, and the like.

Examples of the trienoic acids are the octadecatrienoic acids, for example, linolenic acid, eleostearic acid, pseudoeleostearic acid, and the like.

Carboxylic acids containing functional groups such as hydroxy groups can be employed. Hydroxy acids, particularly the alpha hydroxy acids include glycolic acid, lactic acid, the hydroxyvaleric acids, the hydroxy caproic acids, the hydroxyheptanoic acids, the hydroxy caprylic acids, the hydroxynonanoic acids, the hydroxycarpric acids, the hydroxydecanoic acids, the hydroxy lauric acids, the hydroxytridecanoic acids, the hydroxymyristic acids, the hydroxypentadecanoic acids, the hydroxypalmitic acids, the hydroxyhexadecanoic acids, the hydroxyheptadecanoic acids, the hydroxy stearic acids, the hydroxyoctadecenoic acids, for example, ricinoleic acid, ricinelardic acid, hydroxyoctadecanoic acids, for example, ricinstearolic acid, the hydroxyeicosanoic acids, for example, hydroxyarachidic acid, the hydroxydocosanoic acids, for example, hydroxybehenic acid, and the like.

Examples of acetylated hydroxyacids are ricinoleyl lactic acid, acetyl ricinoleic acid, chloroacetyl ricinoleic acid, and the like.

Examples of the cyclic aliphatic carboxylic acids are those found in petroleum called naphthenic acids, hydnocarpic and chaulmoogric acids, cyclopentane carboxylic acids, cyclohexanecarboxylic acid, campholic acid, fencholic acids, and the like.

Examples of aromatic monocarboxylic acids are benzoic acid, substituted benzoic acids, for example, the toluic acids, the xylenic acids, alkoxy benzoic acid, phenyl benzoic acid, naphthalene carboxylic acid, and the like.

Mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil, and other fish oils, teaseed oil, partially or completely hydrogenated animal and vegetable oils are advantageously employed. Fatty and similar acids include those derived from various waxes, such as beeswax, spermaceti, montan wax, Japan wax, coccerin and carnauba wax. Such acids include carnaubic acid, cerotic acid, lacceric acid, montanic acid, psyllastearic acid etc. One may also employ higher molecular weight carboxylic acids derived by oxidation and other methods, such as from paraffin wax, petroleum and similar hydrocarbons; resinic and hydroaromatic acids, such as hexahydrobenzoic acid, hydrogenated naphthoic, hydrogenated carboxy diphenyl, naphthenic, and abietic acid; Twitchell fatty acids, carboxydiphenyl pyridine carboxylic acid, blown oils, blown oil fatty acids and the like.

Other suitable acids include phenylstearic acid, benzoylnonylic acid, cetyloxybutyric acid, cetyloxyacetic acid, chlorstearic acid, etc.

Examples of the polycarboxylic acids are those of the aliphatic series, for example, oxalic malonic, succinic, glutaric, adipic, pimelic, suberic, azelaic, sebacic, nonanedicarboxylic acid, decanedicarboxylic acids, undecanedicarboxylic acids, and the like.

Examples of unsaturated aliphatic polycarboxylic acids are fumaric, maleic, mesacenic, citraconic, glutaconic, itaconic, muconic, aconitic acids, and the like.

Examples of aromatic polycarboxylic acids are phthalic, isophthalic acids, terephthalic acids, substituted derivatives thereof (e.g. alkyl, chloro, alkoxy, etc. derivatives), biphenyldicarboxylic acid, diphenylether dicarboxylic acids, diphenylsulfone dicarboxylic acids and the like.

Higher aromatic polycarboxylic acids containing more than two carboxylic groups are hemimellitic, trimellitic, trimesic, mellophanic, prehnitic, pyromellitic acids, mellitic acid, and the like.

Other polycarboxylic acids are the dimeric, trimeric and polymeric acids, for example, dilinoleic trilinoleic, and other polyacids sold by Emery Industries, and the like. Other polycarboxylic acids include those containing ether groups, for example, diglycolic acid. Mixtures of the above acids can be advantageously employed.

In addition, acid precursors such as esters, glycerides, etc. can be employed in place of the free acid.

The moles of acylating agent reacted with the polyaminomethyl compound will depend on the number of acetylation reactive positions contained therein as well as the number of moles one wishes to incorporate into the molecule. We have advantageously reacted 1 to 15 moles of acylating agent per mole of polyaminophenol, but preferably 3 to 6 moles.

The following examples are illustrative of the preparation of the acylated polyaminomethyl phenol condensate.

The following general procedure is employed in acylating. The condensate is mixed with the desired ratio of acid and a suitable azeotroping agent is added. Heat is then applied. After the removal of the calculated amount of water (1 to 2 equivalents per mole of acid employed), heating is stopped and the azeotroping agent is evaporated under vacuum. The temperature during the reaction can vary from 80°–200° C. (except where the formation of the cyclic amidine type structure is desired and the maximum temperature is generally 200–280° C.). The times range from 4 to 24 hours. Here again, the true test of the degree of reaction is the amount of water removed.

*Example 3aA*

In a 5 liter, 3 necked flask furnished with a stirring device, thermometer, phase separating trap, condenser and heating mantle, 697 grams of 3a (one mole of the TMP-tetraethylene pentamine reaction product) is dissolved in 600 ml. of xylene. 846 grams of oleic acid (3 moles) is added to the TMP-polyamine condensate with stirring in ten minutes. The reaction mixture was then heated gradually to about 145° in half an hour and then held at about 160° over a period of 3 hours until 54 grams (3 moles) of water is collected in the side of the tube. The solvent is then removed with gentle heating under a reduced pressure of approximately 20 mm. The product is a dark brown viscous liquid with a nitrogen content of 14.5%.

*Example 3aA'*

The prior example is repated except that the final reaction temperature is maintained at 240° C. and 90 grams (5 moles) of water is removed instead of 54 grams.

Infrared analysis of the product indicates the presence of a cyclic amidine ring.

*Example 7aA*

The reaction product of Example 7a (TMP and oxyethylated Duomeen S) is reacted with palmitic acid in the manner of Example 3aA. A xylene soluble product is formed.

The following examples of acylated polyaminomethyl phenol condensates are prepared in the manner of the above examples. The products obtained are dark viscous liquids.

*Example 28aA*

Into a 300 milliliter flask, fitted with a stirring device, thermometer, phase separating trap, condenser and heating mantle, is placed a xylene solution of the product of Example 28a containing 98.0 grams (0.05 mole) of the reaction product of 2,4,6-trimethylolphenol and polyamine N–400 and about 24 grams of xylene. To this solution is added with stirring 30.0 grams (0.15 mole) of lauric acid. The reaction mixture is heated for about one hour at a maximum reaction temperature of 190° C. and 6 milliliters of water are collected. The calculated amount of water for imidazoline formation is 5.4 milliliters. The resulting product as an 88 percent xylene solution is a dark brown thick liquid.

*Example 28bA*

Into a 300 milliliter flask, fitted with a stirring device, thermometer, phase separating trap, condenser and heating mantle is placed a xylene solution of the product of Example 28b containing 35.0 grams (0.025 mole) of the reaction product of 2,6-dimethylol-4-methylphenol and polyamine N–400 and about 20 grams of xylene. To this solution is added with stirring 14.1 grams (0.05 mole) of oleic acid. The reaction mixture is heated at reflux for 4.5 hours at a maximum temperature of 183° C. and 1.0 milliliters of water is collcted, the calculated amount of water for amide formation being 0.9 milliliters. The product is a dark burgundy liquid (as 70.5% xylene solution).

*Example 29bA*

This experiment is performed in the same equipment and in the same manner as employed in Example 28bA. Into the flask is placed a xylene solution of the product of Example 29b containing 40.9 grams (0.025 mole) of the reaction product of 2,6-dimethylol-4-tertiarybutyl phenol and polyamine N–400 and about 47 grams of xylene. To this solution is added with stirring 7.2 grams (0.05 mole) of octanoic acid. The reaction mixture is heated at reflux for 3.75 hours at a maximum temperature of 154° C. and 1.3 milliliters of water is collected. The calculated amount of water for amide formation is 0.9 milliliter. The product as a 49.82 percent xylene solution was brown.

*Example 30bA*

This experiment is performed in the same manner and in the same equipment as is employed in Example 28bA. Into the flask is placed a xylene solution of the product of Example 30b containing 39.6 grams (0.025 mole) of the reaction product of 2,6-dimethylol-4-nonylphenol and polyamine N–400 and about 32 grams of xylene. To this solution is added with stirring 14.2 grams (0.05 mole) of stearic acid. The reaction mixture is heated at reflux for 4 hours at a maximum temperature of 160° C. and 1.0 milliliter of water is collected. The calculated amount of water for amide formation is 0.9 milliliter. The product as a 62.5% xylene solution is a brown liquid.

TABLE V.—ACYLATED PRODUCTS OF TABLE I

| Example | Acid | Grams of acid per gram-mole of condensate | Grams of water removed |
|---|---|---|---|
| 1aA | Oleic | 846 | 54 |
| 2aA | Nonanoic | 316 | 36 |
| 3aA | Oleic | 846 | 54 |
| 3aA' | do | 846 | 90 |
| 4aA | Stearic | 852 | 54 |
| 5aA | Lauric | 600 | 54 |
| 6aA | Myristic | 684 | 54 |
| 7aA | Palmitic | 768 | 54 |
| 8aA | Propanoic | 222 | 54 |
| 9aA | Dimeric [1] | 1,800 | 54 |
| 10aA | Oleric | 846 | 54 |
| 11aA | do | 846 | 54 |
| 12aA | Sunaptic acid [2] | 990 | 54 |
| 14aA | Oleic | 846 | 54 |
| 15aA | Palmitic | 1,536 | 108 |
| 16aA | Oleic | 846 | 54 |
| 17aA | do | 1,692 | 108 |
| 18aA | do | 1,692 | 108 |
| 19aA | do | 846 | 54 |
| 23aA | Acetic | 180 | 54 |
| 28aA | Lauric | 600 | 120 |

[1] Dilinoleic acid sold by Emery Industries. Also employed in examples of Tables VI, VII and VIII.
[2] Naphthenic acid sold by Sun Oil Company, average molecular weight 220-230.

TABLE VI.—ACYLATED PRODUCTS OF TABLE II

| Example | Acid | Grams of acid used per gram-mole of condensate | Grams of water removed |
|---|---|---|---|
| 1bA | Stearic | 568 | 36 |
| 2bA | Oleic | 564 | 36 |
| 3bA | Lauric | 800 | 72 |
| 4bA | Acetic | 120 | 36 |
| 5bA | Myristic | 456 | 36 |
| 6bA | Palmitic | 512 | 36 |
| 7bA | Dimeric [1] | 1,200 | 36 |
| 8bA | Oleic | 564 | 36 |
| 9bA | do | 564 | 36 |
| 10bA | Sunaptic acid [2] | 660 | 36 |
| 11bA | Oleic | 564 | 36 |
| 12bA | do | 564 | 36 |
| 14bA | Palmitic | 512 | 36 |
| 15bA | Acetic | 240 | 72 |
| 16bA | Oleic | 564 | 36 |
| 17bA | do | 1,128 | 72 |
| 18bA | do | 564 | 36 |
| 19bA | do | 564 | 36 |
| 23bA | Lauric | 400 | 36 |
| 28bA | Oleic | 564 | 40 |
| 29bA | Octanoic | 288 | 52 |
| 30bA | Stearic | 569 | 40 |

[1,2] See footnotes at bottom of Table V.

TABLE VII.—ACYLATED PRODUCTS OF TABLE III

| Example | Acid | Grams of acid used per gram-mole of condensate | Grams of water removed |
|---|---|---|---|
| 1cA | Oleic | 564 | 36 |
| 2cA | Palmitic | 512 | 36 |
| 3cA | Lauric | 800 | 72 |
| 4cA | Myristic | 456 | 36 |
| 5cA | Acetic | 120 | 36 |
| 6cA | Dimeric [1] | 1,200 | 36 |
| 7cA | Oleic | 564 | 36 |
| 8cA | do | 564 | 36 |
| 9cA | Sunaptic [2] | 660 | 36 |
| 10cA | Oleic | 564 | 36 |
| 11cA | do | 564 | 36 |
| 12cA | do | 564 | 36 |

[1,2] See footnotes at bottom of Table V.

TABLE VIII.—ACYLATED PRODUCTS OF TABLE IV

| Example | Acid | Grams of acid used per gram-mole of condensate | Grams of water removed |
|---|---|---|---|
| 1dA | Oleic | 1,128 | 72 |
| 2dA | ....do | 1,128 | 72 |
| 3dA | Stearic | 2,272 | 144 |
| 4dA | Lauric | 800 | 72 |
| 5dA | Myristic | 912 | 72 |
| 6dA | Palmitic | 1,024 | 72 |
| 7dA | Oleic | 1,128 | 72 |
| 8dA | Dimeric [1] | 2,400 | 72 |
| 9dA | Sunaptic [2] | 1,320 | 72 |
| 10dA | Acetic | 240 | 72 |
| 11dA | Oleic | 1,128 | 72 |
| 12dA | ....do | 1,128 | 72 |
| 13dA | ....do | 1,128 | 72 |
| 14dA | ....do | 1,128 | 72 |
| 15dA | Palmitic | 2,048 | 144 |
| 16dA | Myristic | 912 | 72 |
| 17dA | Oleic | 1,128 | 72 |
| 18dA | Palmitic | 1,024 | 72 |
| 19dA | Stearic | 1,136 | 72 |
| 20dA | ....do | 1,136 | 72 |
| 21dA | Oleic | 1,128 | 72 |
| 22dA | ....do | 1,128 | 72 |
| 23dA | ....do | 1,128 | 72 |
| 24dA | ....do | 1,128 | 72 |

[1,2] See footnotes at bottom of Table V.

Reference has been made and reference will be continued to be made herein to oxyalkylation procedures. Such procedures are concerned with the use of monoepoxides and principally those available commercially at low cost, such as ethylene oxide, propylene oxide and butylene oxide, octylene oxide, styrene oxide, etc.

Oxyalkylation is well known. For purposes of brevity reference is made to Parts 1 and 2 of U.S. Patent No. 2,792,371, dated May 14, 1957, to Dickson, in which particular attention is directed to the various patents which describe typical oxyalkylation procedure. Furthermore, manufacturers of alkylene oxides furnish extensive information as to the use of oxides. For example, see the technical bulletin entitled "Ethylene Oxide" which has been distributed by the Jefferson Chemical Company, Houston, Texas. Note also the extensive bibliography in this bulletin and the large number of patents which deal with oxyalkylation processes.

The following examples illustrate oxyalkylation.

*Example 1aAO₁*

The reaction vessel employed is a 4 liter stainless steel autoclave equipped with the usual devices for heating and heat control, a stirrer, inlet and outlet means, etc., which are conventional in this type of apparatus. The stirrer is operated at a speed of 250 r.p.m. Into the autoclave is charged 1230 grams (1 mole) of 1aA, and 500 grams of xylene. The autoclave is sealed, swept with nitrogen, stirring started immediately, and heat applied. The temperature is allowed to rise to approximately 100° C. at which time the addition of ethylene oxide is started. Ethylene oxide is added continuously at such speed that it is absorbed by the reaction mixture as added. During the addition 132 grams (3 moles) of ethylene oxide is added over 2¼ hours at a temperature of 100° C. to 120° C. and a maximum pressure of 30 p.s.i.

*Example 1aAO₂*

The reaction mass of Example 1AO is transferred to a larger autoclave (capacity 15 liters) similarly equipped. Without adding any more xylene the procedure is repeated so as to add another 264 grams (6 moles) of ethylene oxide under substantially the same operating conditions but requiring about 3 hours for the addition.

*Example 1aAO₃*

In a third step, another 264 grams (6 moles) of ethylene oxide is added to the product of Example 1aAO₂. The reaction slows up and requires approximately 6 hours, using the same operating temperatures and pressures.

*Example 1aAO₄*

At the end of the third step the autoclave is opened and 25 grams of sodium methylate is added, the autoclave is flushed out as before, and the fourth and final oxyalkylation is completed, using 1100 grams (25 moles) of ethylene oxide. The oxyalkylation is completed within 6½ hours, using the same temperature range and pressure as previously.

*Example 1aAO₅*

The reaction vessel employed is the same as that used in Example 1aAO. Into the autoclave is charged 1230 g. (1 mole) of 1aA and 500 grams of xylene. The autoclave is sealed, swept with nitrogen, stirring is started immediately, and heat is applied. The temperature is allowed to rise to approximately 100° C. at which time the addition of propylene oxide is started. Propylene oxide is added continuously at such speed that it is absorbed by the reaction mixture as added. During the addition 174 g. (3 moles) of propylene oxide are added over 2½ hours at a temperature of 100 to 120° C. and a maximum pressure of 30 lbs. p.s.i.

*Example 1aAO₆*

The reaction mass of Example 1aAO₅ is transferred to a larger autoclave (capacity 15 liters). The procedure is repeated so as to add another 174 g. (3 moles) of propylene oxide under substantially the same operating conditions but requiring about 3 hours for the addition.

*Example 1aAO₇*

At the end of the second step (Example 1aAO₂) the autoclave is opened, 25 g. of sodium methylate is added, and the autoclave is flushed out as before. Oxyalkylation is continued as before until another 522 g. (9 moles) of propylene oxide are added. 8 hours are required to complete the reaction.

The following examples of oxyalkylation are carried out in the manner of the examples described above. A catalyst is used in the case of oxyethylation after the initial 15 moles of ethylene oxide are added, while in the case of oxypropylation, the catalyst is used after the initial 6 moles of oxide are added. In the case of oxybutylation, oxyoctylation, oxystyrenation, etc. the catalyst is added at the beginning of the operation. In all cases the amount of catalyst is about 1½ percent of the total reactant present. The oxides are added in the order given reading from left to right. The results are presented in the following tables:

TABLE IX.—THE OXYALKYLATED PRODUCTS OF TABLE I

| Example | Grams of oxide added per gram-mole of condensate | | | | |
|---|---|---|---|---|---|
| | EtO | PrO | BuO | Octylene oxide | Styrene oxide |
| 1aO | 132 | 348 | | | |
| 2aO | 132 | 870 | | | |
| 3aO | | | 288 | | |
| 4aO | | 174 | | | |
| 5aO | 660 | | | | |
| 6aO | 440 | 174 | | | |
| 7aO | | 348 | 216 | | |
| 8aO | | 698 | 432 | | |
| 9aO | | | 288 | | |
| 10aO | 880 | | | | |
| 12aO | 1,100 | 348 | | | |
| 17aO | | | | 384 | |
| 20aO | | 1,740 | | | |
| 21aO | 264 | 1,740 | | | |
| 23aO | | | | | 390 |
| 25aO | | 1,740 | 288 | | |
| 28aO | 880 | | 432 | | |
| | 396 | 698 | | | |

TABLE X.—THE OXYALKYLATED PRODUCTS OF TABLE II

| Example | Grams of oxide added per gram-mole of condensate | | | | |
|---|---|---|---|---|---|
| | EtO | PrO | BuO | Octylene oxide | Styrene oxide |
| 1bO | 264 | | | | |
| 2bO | 396 | | | | |
| 3bO | 132 | 2,030 | | | |
| 4bO | 1,100 | | 216 | | |
| 5bO | 1,320 | | | | |
| 6bO | 1,540 | | 288 | | |
| 7bO | 1,760 | | | | |
| 8bO | 1,980 | | | | |
| 9bO | 396 | 870 | | | |
| 10bO | | 1,160 | 432 | | |
| 12bO | | | | | 130 |
| 16bO | | | | 128 | |
| 18bO | | | 288 | | |
| 21bO | | | | | 260 |
| 25bO | 660 | 1,450 | 288 | | |
| 28bO | | 1,450 | 288 | | |
| 29bO | 440 | 580 | | | |
| 30bO | | | | 128 | |

TABLE XI.—THE OXYALKYLATED PRODUCTS OF TABLE III

| Example | Grams of oxide added per gram-mole of condensate | | | | |
|---|---|---|---|---|---|
| | EtO | PrO | BuO | Octylene oxide | Styrene oxide |
| 1cO | 396 | | | | |
| 2cO | 660 | | | | |
| 3cO | 1,100 | | | | |
| 4cO | 1,320 | | | | |
| 5cO | 2,200 | | | | |
| 6cO | | 552 | | | |
| 7cO | | | | | 230 |
| 8cO | 1,320 | 870 | 216 | | |
| 9cO | 880 | 2,030 | | | |
| 10cO | 660 | | 360 | | |
| 12cO | | | | 256 | |

TABLE XII.—THE OXYALKYLATED PRODUCTS OF TABLE IV

| Example | Grams of oxide added per gram-mole of condensate | | | | |
|---|---|---|---|---|---|
| | EtO | PrO | BuO | Octylene oxide | Styrene oxide |
| 1dO | | | 432 | | |
| 2dO | | 1,450 | | | |
| 3dO | | 2,320 | | | |
| 4dO | 660 | 2,030 | | | |
| 5dO | 1,100 | 174 | | | |
| 6dO | | 1,450 | | | |
| 7dO | | | | | 420 |
| 8dO | | | | 512 | |
| 9dO | | | 720 | | |
| 10dO | 132 | 870 | | | |
| 13dO | 132 | 1,160 | | | |
| 14dO | 264 | 2,030 | | | |
| 15dO | 264 | 2,900 | | | |
| 16dO | 132 | 1,160 | 228 | | |
| 17dO | 1,100 | 698 | 228 | | |
| 18dO | 1,320 | | 720 | | |
| 19dO | | 1,740 | 432 | | |
| 20dO | | 2,320 | | | |
| 21dO | | 2,900 | 228 | | |
| 22dO | 132 | 2,030 | | | |

TABLE XIII.—THE OXYALKYLATED PRODUCTS OF TABLE V

| Example | Grams of oxide added per gram-mole of condensate | | | | |
|---|---|---|---|---|---|
| | EtO | PrO | BuO | Octylene oxide | Styrene oxide |
| 1aAO$_1$ | 132 | | | | |
| 1aAO$_2$ | | | | | 390 |
| 1aAO$_3$ | 660 | | | | |
| 1aAO$_4$ | 1,760 | | | | |
| 1aAO$_5$ | | 174 | | | |
| 1aAO$_6$ | | 348 | | | |
| 1aAO$_7$ | 396 | 522 | | | |
| 2aAO | 264 | | | | |
| 3aAO | | | | 384 | |
| 3aAO | | | | | 390 |
| 4aAO | 1,540 | | | | |
| 5aAO | 1,100 | | | | |
| 6aAO | 1,320 | | | | |
| 7aAO | 1,100 | 870 | | | |
| 8aAO | 1,100 | | 216 | | |
| 9aAO | | 1,450 | | | |
| 10aAO | | 2,030 | | | |
| 17aAO | | 1,450 | | | |
| 20aAO | 264 | 2,320 | | | |
| 23aAO | 264 | | 720 | | |
| 28aAO | 440 | 580 | | | |

TABLE XIV.—THE OXYALKYLATED PRODUCTS OF TABLE VI

| Example | Grams of oxide added per gram-mole of acylated product | | | | |
|---|---|---|---|---|---|
| | EtO | PrO | BuO | Octylene oxide | Styrene oxide |
| 1bAO | 132 | | | | |
| 2bAO | 264 | | | | |
| 3bAO | | | | 256 | |
| 3bA'O | 1,760 | | | | |
| 4bAO | | | | | 420 |
| 5bAO | 880 | 870 | | | |
| 6bAO | 880 | | 288 | | |
| 7bAO | 660 | 2,030 | | | |
| 8bAO | 660 | | 720 | | |
| 9bAO | 880 | 2,320 | | | |
| 10bAO | 880 | 1,450 | 432 | | |
| 14bAO | 1,760 | 1,450 | 216 | | |
| 28bAO | 440 | 580 | | | |
| 29bAO | | 522 | 216 | | |
| 30bAO | 440 | | 360 | | |

TABLE XV.—THE OXYALKYLATED PRODUCTS OF TABLE VI

| Example | Grams of oxide added per gram-mole of acylated product | | | | |
|---|---|---|---|---|---|
| | EtO | PrO | BuO | Octylene oxide | Styrene oxide |
| 1cAO | 132 | | | | |
| 2cAO | | | | | 390 |
| 3cAO | 880 | | | | |
| 4cAO | 1,320 | | | | |
| 5cAO | 220 | | | | |
| 6cAO | | | | 256 | |
| 7cAO | | | 216 | | |
| 8cAO | | 348 | | | |
| 9cAO | | | 432 | | |
| 10cAO | 880 | 870 | | | |
| 11cAO | 880 | 870 | 216 | | |
| 12cAO | 1,320 | | 288 | | |

TABLE XVI.—THE OXYALKYLATED PRODUCTS OF TABLE VII

| Example | Grams of oxide added per gram-mole of acylated product | | | | |
|---|---|---|---|---|---|
| | EtO | PrO | BuO | Octylene oxide | Styrene oxide |
| 1dAO | 132 | | | | |
| 2dAO | | | | 512 | |
| 3dAO | | 174 | | | |
| 4dAO | | | | 216 | |
| 5dAO | | | | | 520 |
| 6dAO | | | | 432 | |
| 7dAO | 660 | | | | |
| 8dAO | 1,100 | | | | |
| 9dAO | 1,760 | | | | |
| 10dAO | 1,980 | | | | |
| 13dAO | 660 | 580 | | | |
| 14dAO | 660 | 1,450 | | | |
| 15dAO | 660 | 1,740 | | 288 | |
| 16dAO | 1,100 | 2,320 | | 432 | |
| 17dAO | | 870 | | 216 | |
| 18dAO | | 1,450 | | 216 | |
| 19dAO | | 1,740 | | 432 | |
| 20dAO | | 2,610 | | | |
| 21dAO | | 2,900 | | | |
| 22dAO | | 3,190 | | | |

Since the oxyalkylated, and the acylated and oxyalkylated products have terminal hydroxy groups, they can be acylated. This step is carried out in the manner previously described for acylation. These examples are illustrative and not limiting.

*Example 1aOA*

One mole (919 grams) of 1aO mixed with 846 grams (three moles) of oleic acid and 300 ml. xylene. The reaction mixture is heated to about 150–160° C. over a period of 2 hours until 54 grams (3 moles) of water are removed. Xylene is then removed under vacuum. The product 1aOA is xylene soluble.

*Example 1aAOA*

The process of the immediately previous example is repeated using 1aAO. The product 1aAOA is xylene soluble.

Additional examples are presented in the following tables. All of the products are dark, viscous liquids.

TABLEX VII.—THE ACYLATED PRODUCTS OF TABLES IX, X, XI, XII

| Example | Acid | Grams of acid per gram-mole of oxyalkylated product | Grams water removed |
|---|---|---|---|
| 1aOA | Oleic | 282 | 18 |
| 2aOA | do | 282 | 18 |
| 3aOA | do | 282 | 18 |
| 4aOA | Stearic | 284 | 18 |
| 28aOA | do | 284 | 18 |
| 1bOA | Myristic | 228 | 18 |
| 2bOA | Stearic | 284 | 18 |
| 3bOA | Oleic | 282 | 18 |
| 4bOA | do | 282 | 18 |
| 28bOA | Stearic | 284 | 18 |
| 29bOA | Oleic | 282 | 18 |
| 30bOA | Lauric | 200 | 18 |
| 1cOA | Oleic | 282 | 18 |
| 2cOA | do | 282 | 18 |
| 3cOA | do | 282 | 18 |
| 4cOA | Stearic | 284 | 18 |
| 1dOA | Oleic | 564 | 36 |
| 2dOA | Stearic | 568 | 36 |
| 3dOA | Oleic | 564 | 36 |
| 4dOA | do | 564 | 36 |

TABLE XVIII.—THE ACYLATED PRODUCTS OF TABLES XIII, XIV, XV, XVI

| Example | Acid | Grams of acid per gram-mole of oxyalkylated product | Grams water removed |
|---|---|---|---|
| 1aAOA | Oleic | 282 | 18 |
| 2aAOA | Stearic | 284 | 18 |
| 3aAOA | Oleic | 282 | 18 |
| 4aAOA | Stearic | 284 | 18 |
| 28aAOA | Lauric | 200 | 18 |
| 1bAOA | Oleic | 282 | 18 |
| 2bAOA | do | 282 | 18 |
| 3bAOA | Stearic | 284 | 18 |
| 4bAOA | Oleic | 282 | 18 |
| 28bAOA | Stearic | 284 | 18 |
| 29bAOA | Oleic | 564 | 36 |
| 30bAOA | do | 282 | 18 |
| 1cAOA | Myristic | 228 | 18 |
| 2cAOA | Lauric | 200 | 18 |
| 3cAOA | Oleic | 282 | 18 |
| 4cAOA | do | 282 | 18 |
| 1dAOA | Stearic | 568 | 36 |
| 2dAOA | do | 568 | 36 |
| 3dAOA | Oleic | 564 | 36 |
| 4dAOA | do | 564 | 36 |

(1) ANTI-SLUDGING AND COLOR STABILIZING ADDITIVES FOR FUEL OILS

This phase of our invention relates to the use of the aforementioned compositions to improve hydrocarbon fuels, particularly fuel oils, since they are capable of preventing or inhibiting undesirable color formation and the sludging and/or clogging tendencies generally exhibited by hydrocarbon fuels, such as those utilized in burner systems, tanks, diesel and jet engines, and other industrial and domestic equipment. These compounds are particularly useful in engines such as jet and diesel engines, where the problem of thermal stabilization arises. In addition, they are capable of removing preformed deleterious matter from filters, screens, and the like, which deleterious matter is formed by deterioration of and/or the presence of foreign bodies (e.g. water) in the fuel oils.

Hydrocarbons, such as distillate fuels, for example, those having a normal distillation range of from about 300° F. to about 700° F., and particularly those from about 340° F. to about 640° F., generally have a marked tendency to deteriorate under oxidizing conditions, and to form sludge. Also, the presence of impurities in such fuels, such as the presence of moisture, dispersed water, organic and/or inorganic foreign matter and the like, causes the formation of insoluble products which tend to settle out and adhere to surfaces with which they come in contact, thereby in turn, causing clogging or plugging of filters, strainers, screens, conduit lines, and the like, of the equipment in which they are used. This necessitates frequent cleaning and even replacement of parts, thereby markedly decreasing the performance efficiency of various equipment which utilizes such fuel oils.

The problem of screen clogging is common, particularly in domestic fuel oil systems employing distillate fuel oils produced by distillation or cracking of petroleum, which fuels are characterized by their relatively low viscosity and other properties. Fuel oils of this type generally conform to the specifications set forth in Commercial Standards C.S. 12–40 for Nos. 1, 2 and 3 fuel oils. Petroleum distillates within the ranges specified and which generally do not exceed 700° F., and preferably are below 675° F., for use as diesel fuels, are further examples of the type of oils which under conditions described herein have a tendency to clog screens or filters, particularly when such fuels contain minor amounts of water dispersed therein.

Another place where screen clogging and plugging of conduit lines is encountered is in fuel oil storage tanks, which latter may be connected to burner systems or engines, etc. The stored fuel generally comes in contact with air, moisture, etc., which causes formation and precipitation of sludge materials, the latter depositing on and clogging the screens or filters used for protecting the burners or engines using such fuel oils.

The compositions of this invention inhibit sludging tendencies of hydrocarbon fuel oils. They inhibit sludging and precipitation of contaminants in hydrocarbon distillate fuel oils, particularly in cracked hydrocarbon fuels. They also provide distillate fuel oil compositions, particularly of fuel oils obtained during cracking of hydrocarbons, which fuel oil compositions have excellent performance characteristics with respect to freedom from screen clogging, even after extensive storage under oxidizing conditions and in the presence of water. They also provide distillate fuel oil compositions which are effective in removing preformed sludge deposits formed in fuel oil systems. In addition they provide a particular type of distillate fuel oil composition or a blend thereof, which is non-corrosive, stable, and effective for removing sludge and for cleaning metal surfaces.

These improvements are attained by dispersing, admixing with or dissolving in hydrocarbon fuel oils (which normally have a tendency to cause clogging or plugging of screens or the like) a minor amount, which is sufficient to inhibit said tendencies, of the compositions of this invention, for example, from 0.001% to 1%, but preferably from 0.003% to 0.010% by weight based on the fuel. If desired, a minor amount of a detergent and/or solutizer may also be added to the composition.

For ease of handling a concentrate of the compounds of this invention in a hydrocarbon oil can be prepared, for example, in concentration of from 5%–50% or higher. This concentrate is then added to the fuel having sludging tendencies to yield the desired active concentration. Other additives can also be added to this concentrate such as oil soluble petroleum sulfonate salts, drying agents, etc.

The hydrocarbon distillate fuel oils in which the active ingredient and/or ingredients of this invention are dispersed or dissolved may be treated or untreated cracked fuel oils, or mixtures of cracked fuels with straight run fuel oils, said fuel oils having components normally distilling from about 300° F. to about 700° F. Preferred fuels have a boiling range of from about 340° F. to about 700° F., and particularly from about 400° F. to about 675° F. Specifically, hydrocarbon distillates which are utilized as bases in compositions of this invention are cracked gas oils, fuel oils, furnace oils, burner oils, diesel fuel oils, kerosene, etc., or mixtures of said cracked fuels with the corresponding or like straight run hydrocarbon fractions.

In general, fuel oils which have marked tendencies towards sludging and clogging of screens, filters, etc., are primarily cracked or blends of cracked and straight run fuel oils which have the following properties:

Gravity, ° API _____ 29–35
ASTM dist., ° F.:
   IBP _____ 400–500
   EBP _____ 600–700
Sulfur, percent w _____ 0.5–1.05
Carbon residue (10 btms.) percent w _____ 0.1–1.4
Pour point, ° F _____ 0–15

In systems wherein substantial amounts of moisture are present a drying agent may be added which is compatible with the active ingredients of this invention. By tying up most of the free moisture in this manner, the amount which would normally combine with sludge-forming materials is diminished, thus alleviating a most aggravating clogging problem.

Drying agents which are particularly suited are of the glycol-ether type such as diethylene glycol monomethyl, ethyl N- and ispropyl ether, diethylene glycol mono-butyl ether, diethylene glycol mono-decyl ether, etc., also dipropylene glycol mono-ethyl ether, dipropylene glycol mono-isopropyl ether, dipropylene glycol mono-isoamyl ether, diisobutylene glycol mono-isopropyl ether, ethylene-propylene glycol mono-ethyl ether, ethylene-isobutylene glycol mono-isopropyl ether, etc. Instead of the glycol-ethers, various alcohols may be used such as diols having 6 or more carbon atoms in the molecule such as hexylene glycol, decylene glycol, cetylene glycols, etc., diglycols such as dipropylene glycol, dibutylene glycol, diamylene glycol, ether alcohols and particularly the glycol mono-alkyl ethers, e.g. the Cellosolves such as ethylene glycol mono-ethyl ether, ethylene glycol mono-propyl ether, ethylene glycol mono-tert-butyl ether, ethylene glycol mono-butyl ether, propylene glycol mono-ethyl ether, propylene glycol mono-isoamyl ether, etc. Also glycol mono-tert-butyl ether, ethylene glycol mono-hexyl-butyl ether, propylene glycol mono-isoamyl ether, etc. Also glycerine and the like may be used. For example, the amount of drying agent in the fuel can range from 0–2% or higher, but preferably 0–0.5%.

To distillate fuel oil compositions of this invention may also be added minor amounts of a foaming inhibitor such as silicone liquids, e.g., dimethyl silicone, fluoro organic compounds, chloro paraffins, salts of alkyl alkylene phosphates and the like. Compositions of this invention may be used to remove deposits, formed on metal surfaces such as in tubes, evaporators, heat exchangers, distillation and cracking equipment and the like. They are non-corrosive and do not interfere with the functioning of the liquid in which dispersed.

The following examples illustrate the effectiveness of compositions of this invention as sludge inhibitors and anti-clogging agents.

TEST I.—110° F. ACCELERATED STORAGE TEST

This test is widely accepted throughout the industry as useful in predicting the amount of degradation products that will form in a fuel oil during normal storage conditions. One week at 110° F. is approximately equal to one month ambient storage for this purpose.

Following are results of a 6 week test on a commercial #2 fuel oil:

| Additive | Conc. (p.p.m.) | Mg. sludge/ 100 ml. | Color (optical density units) |
|---|---|---|---|
| None | ------ | 3.0 | 28.4 |
| 4–15 | 25 | 2.2 | 26.7 |
| 4–15 | 75 | 1.3 | 23.6 |
| 4–15 | 150 | 0.9 | 19.8 |

TEST II.—90 MINUTE 300° F. DIESEL TEST

This is a thermal stability test specified by railroads for fuel oil used in diesel engines.

Following are results of a test on a commercial diesel fuel:

| Additive | Conc. (p.p.m.) | Mg. sludge/ 100 ml. | Color (optical density units) |
|---|---|---|---|
| None | ------ | 12.5 | 100+ |
| 4–15 | 50 | 1.6 | 14.8 |

The following compositions also exhibited similarly effective sludge and color inhibition on the same oils.

FUEL ADDITIVE

| Ex. No. | I | | Weight of oxides added to I (grams) |
|---|---|---|---|
| | Reactants (grams) | H₂O eliminated (grams) | |
| 4-1 | 1a (439)+oleic acid (846) | 54 | None. |
| 4-2 | 2a (568)+stearic acid (852) | 54 | Do. |
| 4-3 | 2a (568)+stearic acid (852) | 90 | Do. |
| 4-4 | 4a (523)+lauric acid (600) | 54 | Do. |
| 4-5 | 1b (492)+lauric acid (400) | 36 | Do. |
| 4-6 | 1b (492)+lauric acid (400) | 54 | Do. |
| 4-7 | 2b (662)+lauric acid (400) | 36 | Do. |
| 4-8 | 3b (552)+stearic acid (568) | 36 | Do. |
| 4-9 | 1c (645)+lauric acid (600) | 54 | Do. |
| 4-10 | 1c (645)+oleic acid (846) | 54 | Do. |
| 4-11 | 1d (660)+stearic acid (1136) | 72 | Do. |
| 4-12 | 4d (772)+stearic acid (1136) | 72 | Do. |
| 4-13 | 13d (688)+stearic acid (1136) | 72 | Do. |
| 4-14 | 16d (800)+stearic acid (1136) | 72 | Do. |
| 4-15 | 1a (439)+oleic acid (846) | 54 | PrO (174). |
| 4-16 | 1a (439)+oleic acid (846) | 54 | PrO (348). |
| 4-17 | 1a (439)+oleic acid (846) | 54 | BuO (216). |
| 4-18 | 2a (568)+stearic acid (852) | 54 | PrO (348). |
| 4-19 | 2a (568)+stearic acid (852) | 54 | BuO (216). |
| 4-20 | 2a (568)+stearic acid (852) | 54 | Styrene Oxide (260). |
| 4-21 | 2a (568)+stearic acid (852) | 54 | Octylene Oxide (256). |
| 4-22 | 1b (492)+lauric acid (400) | 36 | PrO (348). |
| 4-23 | 1b (492)+lauric acid (400) | 36 | Styrene Oxide (260). |
| 4-24 | 1c (645)+lauric acid (600) | 54 | PrO (174). |
| 4-25 | 1d (660)+stearic acid (1136) | 72 | PrO (348). |
| 4-26 | 4d (772)+stearic acid (1136) | 72 | Styrene Oxide (260). |
| 4-27 | 16d (800)+stearic acid (1136) | 72 | BuO (216). |

FUEL ADDITIVE

| Ex. No. | I | | II |
|---|---|---|---|
| | Reactants (grams) | H₂O eliminated (grams) | Weight of alkylene oxides added to I in alphabetical order (grams) |
| 4-28 | 28a (1960) | | (A) PrO (54,520) (B) EtO (1750). |
| 4-29 | 28a (1960)+lauric acid (600) | 120 | O. |
| 4-30 | 28a (1960)+lauric acid (600) | 120 | PrO (12,000). |
| 4-31 | 28aO (3054)+stearic acid (284) | 18 | O. |
| 4-32 | 28aAOA | | O. |
| 4-33 | 28b (1400) | | (A) PrO (8240) (B) EtO (1200). |
| 4-34 | 28b (1400)+oleic acid (564) | 40 | O. |
| 4-35 | 28b (1400)+oleic acid (564) | 40 | BuO (1230). |
| 4-36 | 28bAOA | | O. |
| 4-37 | 29b (1635) | | (A) PrO (7470) (B) EtO (730). |
| 4-38 | 29b (1635)+oleic acid (282) | 18 | (A) BuO (870) (B) PrO (360). |
| 4-39 | 29bAOA | | O. |
| 4-40 | 30b (1580) | | (A) PrO (12,150). |
| 4-41 | 30b (1580)+stearic acid (569) | 40 | O. |
| 4-42 | 30b (1580)+stearic acid (569) | 40 | BuO (360). |
| 4-43 | 30bAOA | | O. |

(2) USE IN THE INHIBITION OF ICE FORMATION IN FUELS

This phase of the invention relates to the use of the aforementioned compounds in reducing the tendency of water present as an impurity in liquid fuels to precipitate as a solid at reduced temperatures. More particularly they can be used to prevent the clogging of fuel filters of internal combustion engines, especially aviation internal combustion engines, using such water-contaminated fuels, when such clogging of fuel filters is due to the precipitation at low temperatures of small crystals of the adulterant water.

Liquid fuels very often contain small but significant amounts of water, the fuel often being saturated with water. The presence of such water may be accidental, or it may be the result of the widespread practice of storing fuels, particularly those having a relatively high volatility, over water. In either case, if such fuels are exposed to low, or reduced, temperatures, such as normally occur, for example, at high altitudes or in arctic or near arctic latitudes, the water in the fuel is precipitated in the form of crystals of ice which are usually too small to settle quickly, but which are large enough to clog the filters through which a fuel passes on its way to the combustion chamber or cylinder of an internal combustion engine. This precipitation constitutes a serious problem, particularly in aviation turbine or jet fuels, owing partly to the fineness of the filtration to which these fuels are subjected and partly to the great altitudes at which jet-propelled aircraft cruise. The problem is not, however, confined to just those fuels, but may also be present in the use of other fuels, such as those for aviation and automotive piston engines, particularly in cold latitudes or, for example, under extreme conditions of artificial cooling to avoid vapor lock.

The compounds of this invention eliminate the above-mentioned adverse effects of water in fuels, and provide a method for greatly reducing the tendency of water present as an impurity in internal combustion engine fuels to precipitate as a solid. They provide a method for storing such fuels under conditions which greatly reduce the precipitating tendency and prevent clogging of fuel filters of internal combustion engines due to precipitation of adulterant water in the fuel at low temperature.

The tendency of ice crystals to precipitate at low temperatures from fuels containing water may be greatly reduced and even practically eliminated by adding the compounds of this invention to the fuel in ratios of from .001% to 0.1% by weight or higher, based on weight of fuel, but preferably from 0.005% to 0.01%.

The following examples are presented to illustrate the present invention.

To gasoline saturated with water (which had previously caused filter clogging at −20° C.) is added .01% by weight based on the weight of saturated gasoline of the compositions shown in the following table. Thereafter, no filter clogging occurs even at −40° C.

INHIBITORS FOR ICE FORMATION IN FUELS

| Ex. No. | I | | Weight of oxide added to I (grams) |
|---|---|---|---|
| | Reactants (grams) | H₂O eliminated (grams) | |
| 7-1 | 1a (439)+oleic acid (846) | 54 | EtO (1320). |
| 7-2 | 1a (439)+oleic acid (846) | 72 | EtO (1320). |
| 7-3 | 2a (568)+oleic acid (846) | 72 | EtO (1560). |
| 7-4 | 2a (568)+oleic acid (846) | 72 | EtO (2200). |
| 7-5 | 1b (492)+lauric acid (400) | 36 | EtO (1320). |
| 7-6 | 1b (492)+lauric acid (400) | 36 | EtO (2200). |
| 7-7 | 3b (552)+lauric acid (400) | 36 | EtO (2200). |
| 7-8 | 1c (645)+lauric acid (400) | 54 | EtO (1980). |
| 7-9 | 1c (645)+lauric acid (400) | 54 | EtO (2200). |
| 7-10 | 1d (660)+oleic acid (1128) | 72 | EtO (2200). |
| 7-11 | 1d (660)+oleic acid (1128) | 72 | EtO (2640). |
| 7-12 | 4d (772)+oleic acid (1128) | 72 | EtO (1980). |
| 7-13 | 4d (772)+oleic acid (1128) | 72 | EtO (2640). |
| 7-14 | 16d (800)+oleic acid (1128) | 72 | EtO (2200). |
| 7-15 | 16d (800)+oleic acid (1128) | 72 | EtO (2860). |

(3) USE IN THE FOG INHIBITION OF HYDROCARBONS

This phase of our invention relates to the use of the aforementioned compositions to produce a fog-inhibited hydrocarbon product when added to a hydrocarbon product.

The term "fog," as herein used, does not refer to the aerosol type of fog but, rather, to the cloudiness caused by the presence of minute droplets of an aqueous medium suspended in a hydrocarbon product. In the present application the term "hydrocarbon product" is used with reference to transparent or semi-transparent hydrocarbon products, usually but not invariably overhead fractions such as gasoline, kerosene, diesel fuel, stove oil, gas oil, cleaners' solvent, benzene, toluene, xylene, etc.

Many hydrocarbon products found in commerce contain dissolved water which is precipitable when subjected to reduction in temperature, or other changes in equilibrium, resulting in the precipitation of droplets which are visible as a fog. In other instances, hydrocarbon products are encountered which contain such fogs. Such precipitates are detrimental to the value of such products. This is particularly true in the transparent or semitransparent hydrocarbon oils where such fogs make the oil less desirable and affect the merchantability of the oil. Particular examples of such products include kerosene, gasoline, stove oil, and the like, which are frequently manufactured in the warmer climate of the Gulf Coast states and then shipped and stored in the Northern States with the result that the oils become fogged or cloudy even though originally clear and bright.

This phase of the invention in its principal aspects is concerned with the prevention, elimination or suppression of fog due to precipitation of water particles in hydrocarbon products arising from various causes, particularly temperature drop, instability resulting from supersaturation, etc. This objective is accomplished by the use of minute quantities of additives herein described. This phase of the invention is also concerned with fogs caused by any precipitated aqueous phase or dilute aqueous solution, e.g., a dilute solution of an acid, salt, base or organic compound, as well as pure water. For sake of convenience, any such aqueous media are hereinafter referred to merely as water in view of the fact that it is the aqueous content which gives rise to the problems here solved.

Another important aspect, from the practical standpoint, is the prevention of the precipitation of water from hydrocarbon distillates and other products of conventional refining processes where there has been prior contact with water. Precipitation may then occur during passage through the colder portions of pipe lines. Such precipitated water is frequently highly corrosive and sometimes separates from the hydrocarbon product to produce pockets in the pipe lines.

All hydrocarbon products do not necessarily produce fogs upon reduction in temperature as often met in commerce for various reasons. The present invention is concerned with those hydrocarbon products which are susceptible to fogging.

The prevention or elimination of fogging in hydrocarbon products is a long-recognized problem of commercial importance as is set forth in the issue of National Petroleum News for January 3, 1945, R-63. It has been previously proposed to remove the dissolved moisture from these hydrocarbon products by means of solid desiccating agents such as activated alumina, silica gel, etc. These processes are functional but costly in material, operation and maintenance. In many instances the dissolved water has been removed by blowing the hydrocarbon product with dry air. This method is highly objectionable because of loss of valuable volatile components of the hydrocarbon product and because of the introduction of oxygen into the system, leading to oxidative degradation of the product as manifested by damage to color. Other solutions to the problem are characterized by a mechanical approach.

This phase of our invention represents a practical solution to this problem of inhibiting fog formation, permitting this to be accomplished at a very low cost in materials, equipment and labor, and without any deleterious effect upon the hydrocarbon product. In the present process of prevention of fog formation, the additives are employed in such small amounts as to make the processed hydrocarbon product identical in all other respects with the untreated product.

This phase of our invention is concerned with the presence or potential presence of only those fogs which are visible, these being detectable by visual or light-transmission methods. Suspended water droplets in a hydrocarbon product produce visible fogs only if the droplets are of minute size. Water droplets of large size do not necessarily produce visible fogs and will often settle out on standing. However, upon cooling of a hydrocarbon product containing dissolved water to saturation, at least a portion of the dissolved water will precipitate as a visible fog, the water droplets being of such small size as to remain in suspension for long periods of time, often indefinitely. Droplets of this size give rise to the fogs with which this invention is concerned.

A perfectly clear hydrocarbon product may contain water to saturation at its existing temperature, in which event a cooling of only a few degrees will usually produce an objectionable fog. If such a clear hydrocarbon product does not contain dissolved water to saturation, cooling to the temperature at which it will be saturated will not produce such a fog, but cooling several degrees lower will. If a hydrocarbon product contains such a fog at an existing temperature it is usually evidence that the dissolved water is present to saturation and that more water will precipitate to increase the fog density if the product is cooled below such existing temperature through a given temperature range. The process contemplates incorporation of a minute quantity of a compound of this invention into the hydrocarbon product to clear such an existing fog and inhibit the hydrocarbon product against fog formation when cooled through such range.

The amount of water which can be dissolved in a hydrocarbon product depends upon the particular product and the ambient temperature. The solubility of water in the lighter petroleum fractions such as gasoline is about 0.01% at ordinary temperatures. That for the heavier fractions may be considerably less, whereas aromatic hydrocarbons such as benzene may dissolve water to the extent of approximately 0.1%. As to temperature, there is approximately a tenfold increase in solubility for a 100° F. temperature difference. A fog may result from the solubility decrease due to a small temperature drop and may be visible when the precipitated water is only a few thousandths of a percent. An objectionable fog may appear with a temperature drop of approximately 10° F. or less.

Hydrocarbon products can be protected against fogging upon temperature reduction by subjecting the product to the action of extremely minute amounts of our compounds. Also, by employing somewhat larger, though still minute, amounts of such agents, existing fogs can be eliminated and the hydrocarbon product protected to the same extent against later fogging upon reduction in temperature. These agents can be added directly to the hydrocarbon product. However, it is preferable and more convenient to dissolve our compounds in an oil miscible with the hydrocarbon product to form a reagent solution which is then mixed with the hydrocarbon product. The oil is usually a hydrocarbon and its quantity, while not critical, should be minimized. Inclusion of water in the reagent solution should be minimized, it being desirable to use an essentially anhydrous solvent for these agents.

As to the optimum amount of the additive used, this will depend on the amount of the particular agent in terms of absolute concentration, the amount, if any, of fog already present and which is to be cleared, and the temperature range over which protection against fog formation is desired. As to this last factor, protection over a temperature differential of about 40° F. is usually sufficient commercially, e.g., over a temperature range of about 75° F. to 35° F.

Using this temperature range as a criterion and assuming that no substantial fog is initially present, the addition of our compounds in minute amounts varying from as little as one part in 50,000 or even less, to as much as one part in about 2500 is sufficient, ratios or percentages herein being expressed on a volume basis. Such amounts, for example, are amply sufficient on California diesel fuels and Gulf Coast furnace oils. If there is initially present in the hydrocarbon product a fog resulting from the precipitation of water due to prior cooling to the existing temperature, this fog can be cleared and some protection given against later fog formation, if cooled below the existing temperature, by use of the exemplified amounts. In effect, if addition of one part in 6000 to a saturated but essentially fog free hydrocarbon product at 75° F. will protect against fogs with reduction in temperature to 35° F., addition of the same amount to a fogged hydrocarbon product at, say, 60° F. will clear the fog and protect against fogs to a temperature of about 35° F. In this latter instance, if full protection against a 40° F. temperature drop below 60° F. is required, slightly more than one part in 6000 should be used.

Protection to a temperature of about 35° F. is usually sufficient in commerce as the hydrocarbon product at that temperature contains so little dissolved water that further cooling will not produce a significant additional quantity of fog. However, if protection from 100° F. or above down to 35° is desired, the ratios of reagent to oil, given above, should be increased substantially in proportion to the increased solubilities at the higher temperatures.

The agent can be added to the hydrocarbon product at any existing temperature. However, in treating high-temperature products, e.g., products issuing from distillation equipment at temperatures of 100° F. or higher, it is often preferable to cool the product to some temperature intermediate the highest and the lowest temperatures between which protection against fog is desired and to add the agent at such intermediate temperature in amount sufficient to clear any fog formed during the cooling and sufficient to protect against fog formation during later cooling to such lowest temperature at which protection is desired.

In the commercial application of the process it is desirable to add the fog suppressant at the lowest convenient temperature. On cooling to this temperature, some of the water precipitated from solution may, in some instances, separate. In this event the fog suppressant need be added only in the amount determined by the fog and dissolved water remaining and not by the entire original water content.

The agent should be soluble, in the ratios used, in the hydrocarbon product or in the aqueous medium therein. In view of the minute amounts employed in the process, substantially all of the compounds of our invention fulfill this requirement.

The process is not to be confused with dehydration processes where emulsions, usually of crude oil and dispersed brine, are mixed with de-emulsifying agents to destabilize the oil-water interfaces so that coalescence of the dispersed droplets occurs when a controlled agitation brings two droplets into contact. In such processes the coalescence is continued until the coalesced masses are of such size as to gravitate from the oil. In the present process there is no coalescence and separation of the aqueous droplets and the over-all aqueous content of the hydrocarbon product remains the same albeit any existing fog is caused to disappear. The amount of aqueous medium present must not substantially exceed that which the hydrocarbon product can take up after our compounds have been added and at the lowest temperature at which protection is desired. If the hydrocarbon product contains more than such small amount of aqueous medium it should be dehydrated by other methods before applying the present invention. The present process is best suited to hydrocarbon products supersaturated with less than 0.01% of the aqueous medium or to hydrocarbon products containing dissolved water not substantially in excess of the amount required to saturate the hydrocarbon product at about 150° F. when the agent is not present.

A visual determination of the necessary amount of reagent to be employed is often satisfactory. In such a determination, a sample of the hydrocarbon product, which has been carefully excluded from agitation with air, is introduced into a 4-oz. screw-cap glass bottle so as to fill it within a few tenths of a milliliter of its total capacity. The reagent, usually a dilute solution in oil, is then added in a predetermined amount and the tightly closed bottle immersed in a cooling bath. The bottle is observed periodically until the desired cooling has been attained and the degree of fog formation is then visually observed in diffused daylight. For detection of extremely slight fog formation, the direct rays of the sun are used for the examination. The comparative degree of fog formation can be determined by comparison with a control bottle containing the same hydrocarbon product and which has been subjected to the same treatment except for the addition of the reagent.

The following examples are presented by way of illustration.

*Examples*

A California light diesel fuel is saturated with water at 75° F. The addition of 0.5 part, by volume, of the compositions shown in the following table per 1000 parts of the saturated fuel prevents the formation of fog when the temperature is reduced to 35° F. Without the addition of such additives a fog forms when the diesel fuel is cooled to 35° F.

Similar reductions in cloud point are noted employing these compositions with other fuels, namely gasoline, kerosene, stove oil and Stoddard solvent.

HYDROCARBON FOG INHIBITORS

| Ex. No. | I Reactants (grams) | H₂O eliminated (grams) | Weight of oxides added to I (grams) |
|---|---|---|---|
| 19-1 | 1a (439)+oleic acid (846) | 54 | EtO (660). |
| 19-2 | 1a (439)+oleic acid (846) | 72 | EtO (528). |
| 19-3 | 1a (439)+lauric acid (600) | 54 | EtO (440). |
| 19-4 | 1a (439)+lauric acid (600) | 72 | EtO (352). |
| 19-5 | 2a (568)+lauric acid (600) | 54 | EtO (440). |
| 19-6 | 2a (568)+lauric acid (600) | 72 | EtO (396). |
| 19-7 | 3a (697)+oleic acid (846) | 54 | EtO (660). |
| 19-8 | 1b (492)+oleic acid (564) | 36 | EtO (528). |
| 19-9 | 2b (662)+lauric acid (400) | 36 | EtO (660). |
| 19-10 | 1c (645)+lauric acid (600) | 54 | EtO (792). |
| 19-11 | 3c (907)+lauric acid (600) | 54 | EtO (880). |
| 19-12 | 1d (660)+oleic acid (1128) | 72 | EtO (880). |
| 19-13 | 2d (832)+stearic acid (1136) | 72 | EtO (1100). |
| 19-14 | 4d (772)+stearic acid (1136) | 72 | EtO (880). |
| 19-15 | 16d (800)+stearic acid (1136) | 72 | EtO (1100). |

HYDROCARBON FOG INHIBITORS

| Ex. No. | I Reactants (grams) | H₂O eliminated (grams) | Weight of oxides added to I in alphabetical order (grams) |
|---|---|---|---|
| 19-16 | 28a (1960) | | (A) PrO (580). |
| 19-17 | 28a (1960)+lauric acid (600) | 120 | (A) PrO (116) (B) EtO (1320). |
| 19-18 | 28aO (3054)+stearic acid (284) | 18 | |
| 19-19 | 28aAOA | | |
| 19-20 | 28b (1400) | | EtO (1980). |
| 19-21 | 28b (1400)+oleic acid (564) | 40 | EtO (2640). |
| 19-22 | 28bAOA | | |
| 19-23 | 29b (1635) | | (A) PrO (522) (B) EtO (1980). |
| 19-24 | 29b (1635)+oleic acid (282) | 18 | EtO (1320). |
| 19-25 | 29bO (2655)+oleic acid (282) | 18 | |
| 19-26 | 29bAOA | | EtO (2200). |
| 19-27 | 30b (1580) | | |
| 19-28 | 30b (1580)+stearic acid (569) | 40 | |
| 19-29 | 30b (1580)+stearic acid (569) | 40 | (A) PrO (464) (B) EtO (1320). |
| 19-30 | 30b AOA | | |

(4) USE FOR GASOLINE ANTI-OXIDANTS

This phase of our invention relates to the use of the aforementioned compounds as antioxidants in gasoline.

With the advent of antiknock gasoline, the problems of gasoline stability as to color, gum content and knock rating have become of great importance. Some cracked and straight run gasolines of high quality which are satisfactory for use at the time they are blended deteriorate in storage so that they become darker in color, higher in gum content and of lessened knock rating. Loss of antiknock rating seriously lessens the market value of the gasoline, while gum is likely to deposit in engine induction systems.

Induction system deposits may be the cause of serious operational difficulties, for the accumulation of deposits in the fuel-air induction passageway diminishes its size and therefore diminishes the maximum air flow which the passage is capable of delivering to the engine. The effect of such deposits on engine performance are manifested whenever the engine is operated at or near full throttle as a reduction in power output due directly to the reduction in air flow. In addition, if the engine is equipped with a gear-driven supercharger, deposits may form on the diffuser plate and impeller, overloading the impeller space and possibly resulting in mechanical failure of the supercharger.

Drastic chemical treatment will stabilize cracked gasoline but it is costly because of the losses it entails, particularly in gasoline of high knock rating, and because it is accompanied by destruction or degrading of components having valuable antiknock properties. Chemical treatment is, therefore, undesirable and has in the past been minimized or avoided altogether.

When the compounds of our invention are incorporated in gasoline, they are effective therein, not only to inhibit the formation of gum, but also to prevent formation of deposits in the induction system of internal combustion engines. Fuels comprising the compounds of the invention are, therefore, characterized by improved stability and a lower apparent gum content due to a reduction in the amount of gum deposited during use.

In practice one or a mixture of two or more compounds prepared in accordance with the invention are blended into the fuel at the refinery. Since the compounds are liquids and quite soluble in hydrocarbon fuels derived from petroleum, incorporation is easily accomplished by simply adding the compound, usually in an amount between 0.001% and 0.10% by weight, based on the fuel, and preferably 0.001 to 0.01% by weight, into the fuel blend. In general, depending upon the grade of gasoline, it is desirable to employ proportions within the following ranges:

PREMIUM GRADE GASOLINE BLENDS

Catalytic reformate gasoline____ 50 to 60% by volume.
Catalytically cracked gasoline___ 15 to 25% by volume.
Catalytically cracked rerun gasoline _____ 10 to 20% by volume.
Tetraethyl lead_____ 0.5 to 3.0 cc. per gallon.
Inhibitor _____ 0.001 to 0.1% by weight.

Butane in sufficient amount to obtain a Reid vapor pressure of 8 to 15 pounds per square inch, depending on the season of the year.

REGULAR GRADE GASOLINE BLENDS

Mixed catalytically and thermally cracked petroleum distillate _____ 75 to 90% by volume.
Straight run gasoline_____ 5 to 20% by volume.
Catalytic polymer gasoline_____ 3 to 10% by volume.
Tetraethyl lead_____ 0.5 to 3.0 cc. per gallon.
Inhibitor _____ 0.001 to 0.1% by weight.

Butane in sufficient amount to obtain a Reid vapor pressure of 8 to 15 pounds per square inch, depending on the season of the year.

Fuels in accordance with the invention are characterized by improved oxidation stability, remaining practically unchanged even after four weeks storage in air at fairly high summer temperatures. Because of their improved stability, gum formation is minimized.

The gum present in gasoline may be thought of as consisting of two types "preformed" or actual gum, composed of nonvolatile organic materials, and "potential" gum, composed of oxidizable unsaturated hydrocarbons initially volatile but which, during storage, change in character and become non-volatile, i.e., preformed gum. It is generally agreed that only the preformed gum will deposit in the induction system of an engine. The potential gum is of little significance with respect to engine deposits, although its rate of conversion to preformed gum indicates to some degree the stability of the gasoline in storage. Thus the term "gum" is used throughout this specification and claims to refer to preformed gum. It will be evident from the above discussion that, in terms of this definition, the inhibitors of the invention tend to prevent conversion of potential gum to preformed gum, and also to prevent deposition of preformed gum in the induction system and power section of the engine.

The following examples are presented to illustrate the present invention:

Examples

A gasoline blend is prepared containing 61% catalytic reformate, 20% catalytically cracked gasoline, 15% catalytically cracked rerun gasoline, 4% butane, and 3.0 cc./gal. of tetraethyl lead. The octane number is 99.6. To separate 4 gallon portions of this blend is added 0.002 weight percent, based on the weight of gasoline blend, of each of the compounds of the following table. One portion, taken as a control, contains no inhibitor.

As a measure of the effectiveness of these compounds as oxidation inhibitors, each four gallon portion is stored in 5 gallon tightly closed cans and samples taken at intervals of one and 4 weeks for testing. Storage temperatures are in the range 80–90° F. Tests are made to determine the amount of preformed gum by deposition in accordance with ASTM test, designation D381–46. This test shows the inhibitors of the present invention to be extremely effective in preventing gum formation.

The effectiveness of these inhibitors is also demonstrated by running similar tests-using the above compounds with fuels containing 69% by volume of mixed catalytically and thermally cracked gasoline, 31.3% straight run gasoline, and 0.005% by weight of inhibitor. Similar improvements are noted.

GASOLINE ANTIOXIDANTS

| Ex. No. | I | | Weight of oxides added to I (grams) |
|---|---|---|---|
| | Reactants (grams) | $H_2O$ eliminated (grams) | |
| 21-1___ | 1a (439)+oleic acid (846)_____ | 54 | None. |
| 21-2___ | 1a (439)+oleic acid (846)_____ | 72 | Do. |
| 21-3___ | 2a (568)+palmitic acid (769)___ | 54 | Do. |
| 21-4___ | 2a (568)+palmitic acid (769)___ | 72 | Do. |
| 21-5___ | 3a (679)+myristic acid (685)___ | 54 | Do. |
| 21-6___ | 3a (679)+myristic acid (685)___ | 72 | Do. |
| 21-7___ | 1b (492)+lauric acid (400)_____ | 36 | Do. |
| 21-8___ | 2b (662)+lauric acid (400)_____ | 36 | Do. |
| 21-9___ | 1c (645)+lauric acid (600)_____ | 54 | Do. |
| 21-10__ | 1d (660)+oleic acid (1128)_____ | 72 | Do. |
| 21-11__ | 3d (1004)+lauric acid (800)____ | 72 | Do. |
| 21-12__ | 1a (439)+oleic acid (846)_____ | 54 | PrO (144). |
| 21-13__ | 1a (439)+oleic acid (846)_____ | 54 | BuO (216). |
| 21-14__ | 1a (439)+oleic acid (846)_____ | 54 | Octylene oxide (256). |
| 21-15__ | 1a (439)+oleic acid (846)_____ | 54 | Styrene oxide (260). |

GASOLINE ANTIOXIDANTS

| Ex. No. | I Reactants (grams) | I H₂O eliminated (grams) | Weight of oxides added to I in alphabetical order (grams) |
|---|---|---|---|
| 21-16 | 28a (1960) | | (A) PrO (54,520) (B) EtO (1750). |
| 21-17 | 28a (1960)+lauric acid (600). | 120 | O. |
| 21-18 | 28a (1960)+lauric acid (600). | 120 | PrO (12,000). |
| 21-19 | 28aO (3054)+stearic acid (284). | 18 | O. |
| 21-20 | 28aAOA | | O. |
| 21-21 | 28b (1400) | | (A) PrO (8240) (B) EtO (1200). |
| 21-22 | 28b (1400)+oleic acid (564). | 40 | O. |
| 21-23 | 28b (1400)+oleic acid (564). | 40 | BuO (1230). |
| 21-24 | 28bAOA | | O. |
| 21-25 | 29b (1635) | | (A) PrO (7470) (B) EtO (730). |
| 21-26 | 29b (1635)+oleic acid (282). | 18 | (A) BuO (870) (B) PrO (360). |
| 21-27 | 29bAOA | | O. |
| 21-28 | 30b (1580) | | (A) PrO (12,150). |
| 21-29 | 30b (1580)+stearic acid (569). | 40 | O. |
| 21-30 | 30b (1580)+stearic acid (569). | 40 | BuO (360). |
| 21-31 | 30bAOA | | O. |

We claim:

1. A distilled hydrocarbon boiling within the range from about 150° F. to 700° F. containing from about 0.00002% to about 1% by weight based upon the distilled hydrocarbon of a member selected from the group consisting of:
(1) acylated, (2) oxyalkylated, (3) acylated then oxyalkylated, (4) oxyalkylated then acylated, (5) acylated, then oxyalkylated and then acylated, monomeric polyaminomethyl phenols characterized by reacting a preformed methylol phenol having one to four methylol groups in the 2, 4, 6 position with a polyamine containing at least one secondary amine group in amounts of at least one mole of secondary polyamine per equivalent of methylol group on the phenol until one mole of water per equivalent of methylol group is removed, in the absence of an extraneous catalyst; and then reacting the thus formed monomeric polyaminomethyl phenol with a member selected from the group consisting of (1) an acylation agent, (2) an oxyalkylation agent, (3) an acylation then an oxyalkylation agent, (4) an oxyalkylation then an acylation agent, and (5) an acylation then an oxyalkylation and then an acylation agent, the preformed methylol phenol having only functional groups selected from the class consisting of methylol groups and phenolic hydroxyl groups, the polyamine having only functional groups selected from the class consisting of primary amino groups, secondary amino groups and hydroxyl groups, the acylation agent having up to 40 carbon atoms and being selected from the class consisting of unsubstituted carboxylic acids, unsubstituted hydroxy carboxylic acids, unsubstituted acylated hydroxy carboxylic acids, lower alkanol esters of unsubstituted carboxylic acids, glycerides of unsubstituted carboxylic acids, unsubstituted carboxylic acid chlorides and unsubstituted carboxylic acid anhydrides, and the oxyalkylation agent being selected from the class consisting of alpha-beta alkylene oxides and styrene oxide.

2. The distilled hydrocarbon of claim 1 where the preformed methylol phenol has all available ortho and para positions substituted with methylol groups.

3. The distilled hydrocarbon of claim 1 where the polyamine is a polyalkylene polyamine.

4. A fuel oil normally susceptible to undesirable color formation and clogging containing a small but effective amount to inhibit color formation and clogging of a member selected from the group consisting of: (1) acylated, (2) oxyalkylated, (3) acylated then oxyalkylated, (4) oxyalkylated then acylated, (5) acylated then oxyalkylated and then acylated, monomeric polyaminomethyl phenols characterized by reacting a preformed methylol phenol having one to four methylol groups in the 2, 4, 6 position with a polyamine containing at least one secondary amine group in amounts of at least one mole of the secondary polyamine per equivalent of methylol groups on the phenol until one mole of water per equivalent of methylol groups is removed, in the absence of an extraneous catalyst; and then reacting the thus formed monomeric polyaminomethyl phenol with a member selected from the group consisting of (1) an acylation agent, (2) an oxyalkylation agent, (3) an acylation then an oxyalkylation agent, (4) an oxyalkylation then an acylation agent, and (5) an acylation then an oxyalkylation and then an acylation agent, the preformed methylol phenol having only functional groups selected from the class consisting of methylol groups and phenolic hydroxyl groups, the polyamine having only functional groups selected from the class consisting of primary amino groups, secondary amino groups and hydroxyl groups, the acylation agent having up to 40 carbon atoms and being selected from the class consisting of unsubstituted carboxylic acids, unsubstituted hydroxy carboxylic acids, unsubstituted acylated hydroxyl carboxylic acids, lower alkanol esters of unsubstituted carboxylic acids, glycerides of unsubstituted carboxylic acids, unsubstituted carboxylic acid chlorides and unsubstituted carboxylic acid anhydrides, and the oxyalkylation agent being selected from the class consisting of alpha-beta alkylene oxides and styrene oxide.

5. A method for reducing the tendency of water present as an impurity in a liquid hydrocarbon fuel to precipitate as ice crystals at reduced temperatures characterized by adding to a liquid hydrocarbon fuel an effective amount up to about 0.1% by weight, based on the weight of fuel, of a member selected from the group consisting of: (1) acylated, (2) oxyalkylated, (3) acylated then oxyalkylated, (4) oxyalkylated then acylated, (5) acylated then oxyalkylated and then acylated, monomeric polyaminomethyl phenols characterized by reacting a preformed methylol phenol having one to four methylol groups in the 2, 4, 6 position with a polyamine containing at least one secondary amine group in amounts of at least one mole of secondary polyamine per equivalent of methylol groups on the phenol until one mole of water per equivalent of methylol groups is removed, in the absence of an extraneous catalyst; and then reacting the thus formed monomeric polyaminomethyl phenol with a member selected from the group consisting of (1) an acylation agent, (2) an oxyalkylation agent, (3) an acylation then an oxyalkylation agent, (4) an oxyalkylation then an acylation agent, and (5) an acylation then an oxyalkylation and then an acylation agent, the preformed methylol phenol having only functional groups selected from the class consisting of methylol groups and phenolic hydroxyl groups, the polyamine having only functional groups selected from the class consisting of primary amino groups, secondary amino groups and hydroxyl groups, the acylation agent having up to 40 carbon atoms and being selected from the class consisting of unsubstituted carboxylic acids, unsubstituted hydroxy carboxylic acids, unsubstituted acylated hydroxyl carboxylic acids, lower alkanol esters of unsubstituted carboxylic acids, glycerides of unsubstituted carboxylic acids, unsubstituted carboxylic acid chlorides and unsubstituted carboxylic acid anhydrides, and the oxyalkylation agent being selected from the class consisting of alpha-beta alkylene oxides and styrene oxide.

6. A method of surpressing the fogging of transparent liquid distilled hydrocarbon products derived from petroleum containing water characterized by dissolving into said hydrocarbon products an effective amount up to about one part per 2500 parts of hydrocarbon product, by volume, of a member selected from the group consisting of: (1) acylated, (2) oxyalkylated, (3) acylated then oxyalkylated, (4) oxyalkylated then acylated, (5) acylated then oxyalkylated and then acylated, monomeric polyaminomethyl phenols characterized by reacting a preformed methylol phenol having one to four methylol groups in the 2, 4, 6 position with a polyamine containing at least one secondary amine group in amounts of at least one mole of secondary polyamine per equivalent of methylol groups on the phenol until one mole of water per equivalent of methylol groups is removed, in the absence of an extraneous catalyst; and then reacting the thus formed monomeric polyaminomethyl phenol with a member selected from the group consisting of (1) an acylation agent, (2) an oxyalkylation agent, (3) an acylation then an oxyalkylation agent, (4) an oxyalkylation then an acylation agent, and (5) an acylation then a oxyalkylation and then an acylation agent, the preformed methylol phenol having only functional groups selected from the class consisting of methylol groups and phenolic hydroxyl groups, the polyamine having only functional groups selected from the class consisting of primary amino groups, secondary amino groups and hydroxyl groups, the acylation agent having up to 40 carbon atoms and being selected from the class consisting of unsubstituted carboxylic acids, unsubstituted hydroxy carboxylic acids, unsubstituted acylated hydroxyl carboxylic acids, lower alkanol esters of unsubstituted carboxylic acids, glycerides of unsubstituted carboxylic acids, unsubstituted carboxylic acid chlorides and unsubstituted carboxyllic acid anhydrides, and the oxyalkylation agent being selected fom the class consisting of alpha-beta alkylene oxides and styrene oxide.

7. A composition consisting essentially of gum forming gasoline and as an antioxidant from 0.001% to 0.10% by weight of a member selected from the group consisting of: (1) acylated, (2) oxyalkylated, (3) acylated then oxyalkylated, (4) oxyalkylated then acylated, (5) acylated then oxyalkylated and then acylated, monomeric polyaminomethyl phenols characterized by reacting a preformed methylol phenol having one to four methylol groups in the 2, 4, 6 position with a polyamine containing at least one secondary amine group in amounts of at least one mole of secondary polyamine per equivalent of methylol groups on the phenol until one mole of water per equivalent of methylol groups is removed, in the absence of an extraneous catalyst; and then reacting the thus formed monomeric polyaminomethyl phenol with a member selected from the group consisting of (1) an acylation agent, (2) an oxyalkylation agent, (3) an acylation then an oxyalkylation agent, (4) an oxyalkylation then an acylation agent, and (5) an acylation then an oxyalkylation and then an acylation agent, the preformed methylol phenol having only functional groups selected from the class consisting of methylol groups and phenolic hydroxyl groups, the polyamine having only functional groups selected from the class consisting of primary amino groups, secondary amino groups and hydroxyl groups, the acylation agent having up to 40 carbon atoms and being selected from the class consisting of unsubstituted carboxylic acids, unsubstituted hydroxy carboxylic acids, unsubstituted acylated hydroxyl carboxylic acids, lower alkanol esters of unsubstituted carboxylic acids, glycerides of unsubstituted carboxylic acids, unsubstituted carboxylic acid chlorides and unsubstituted carboxylic acid anhydrides, and the oxyalkylation agent being selected from the class consisting of alpha-beta alkylene oxides and styrene oxide.

8. The fuel oil of claim 4 where the member is an acylated monomeric polyaminomethyl phenol.

9. The fuel oil of claim 4 where the member is an acylated then oxyalkylated monomeric polyaminomethyl phenol.

10. The fuel oil of claim 9 where the phenol is 2,4,6-trimethylol phenol, the polyamine is diethylene triamine, the acylating agent is oleic acid, and the oxyalkylation agent is at least one 1,2-alkylene oxide having 2 to 4 carbon atoms.

11. The method of claim 5 where the member is an acylated then oxyalkylated monomeric polyaminomethyl phenol.

12. The method of claim 11 where the phenol is 2,4,6-trimethylol phenol, the polyamine is diethylene triamine, the acylating agent is oleic acid, and the oxyalkylation agent is at least one 1,2-alkylene oxide having 2 to 4 carbon atoms.

13. The method of claim 6 where the member is an acylated then oxyalkylated monomeric polyaminomethyl phenol.

14. The method of claim 13 where the phenol is 2,4,6-trimethylol phenol, the polyamine is diethylene triamine, the acylating agent is oleic acid, and the oxyalkylation agent is at least one 1,2-alkylene oxide having 2 to 4 carbon atoms.

15. The composition of claim 7 where the member is an acylated monomeric polyaminomethyl phenol.

16. The composition of claim 7 where the member is an acylated then oxyalkylated monomeric polyaminomethyl phenol.

17. The composition of claim 16 where the phenol is 2,4,6-trimethylol phenol, the polyamine is diethylene triamine, the acylating agent is oleic acid, and the oxyalkylation agent is at least one 1,2-alkylene oxide having 2 to 4 carbon atoms.

18. The distilled hydrocarbon of claim 1 where the acylation agent is a monocarboxy acid having 7 to 39 carbon atoms.

19. The distilled hydrocarbon of claim 1 where the oxyalkylation agent is a 1,2-alkylene oxide having 2 to 4 carbon atoms.

20. The distilled hydrocarbon of claim 1 where the preformed methylol phenol is 2,4,6-trimethylol phenol, the polyamine is a polyalkylene polyamine, the acylation agent is a monocarboxy acid having 7 to 39 carbon atoms, and the oxyalkylation agent is a 1,2-alkylene oxide having 2 to 4 carbon atoms.

References Cited in the file of this patent

UNITED STATES PATENTS

| | | |
|---|---|---|
| 2,797,152 | Hughes et al. | June 25, 1957 |
| 2,805,998 | Cantrell et al. | Sept. 10, 1957 |
| 2,854,324 | Shen et al. | Sept. 30, 1958 |
| 2,902,354 | Giammaria | Sept. 1, 1959 |